(12) United States Patent
Miyake

(10) Patent No.: US 8,072,487 B2
(45) Date of Patent: Dec. 6, 2011

(54) PICTURE PROCESSING APPARATUS, PICTURE RECORDING APPARATUS, METHOD AND PROGRAM THEREOF

(75) Inventor: Izumi Miyake, Tokyo (JP)

(73) Assignee: Fujifilm Corporation, Tokyo (JP)

( * ) Notice: Subject to any disclaimer, the term of this patent is extended or adjusted under 35 U.S.C. 154(b) by 895 days.

(21) Appl. No.: 12/109,196

(22) Filed: Apr. 24, 2008

(65) Prior Publication Data

US 2008/0273082 A1 Nov. 6, 2008

(30) Foreign Application Priority Data

Apr. 25, 2007 (JP) ................................. 2007-115824
May 7, 2007 (JP) ................................. 2007-122642

(51) Int. Cl.
*H04N 13/02* (2006.01)
(52) U.S. Cl. ................................ 348/47; 348/48; 348/50
(58) Field of Classification Search .................... 348/47, 348/48, 50
See application file for complete search history.

(56) References Cited

U.S. PATENT DOCUMENTS

| 6,744,441 | B2 * | 6/2004 | Wu et al. ........................ 345/582 |
| 7,557,824 | B2 * | 7/2009 | Holliman ........................ 348/46 |
| 2004/0070673 | A1 * | 4/2004 | Nakamura .................. 348/207.2 |

FOREIGN PATENT DOCUMENTS

| EP | 1406456 A2 | 4/2004 |
| JP | 2000-207576 A | 7/2000 |
| JP | 2002-024850 A | 1/2002 |
| JP | 2002-24850 A | 1/2002 |
| JP | 2003-51872 A | 2/2003 |
| JP | 2004-120146 A | 4/2004 |
| JP | 2004-120165 A | 4/2004 |
| JP | 2004-163996 A | 6/2004 |
| JP | 2004-193795 A | 7/2004 |
| KR | 1020040027412 A | 4/2004 |

OTHER PUBLICATIONS

Explanation of Circumstances Concerning Accelerated Examinaton of Japanese Application No. 2007-115824, including an English translation.
Explanation of Circumstances Concerning Accelerated Examinaton of Japanese Application No. 2007-122642, including an English translation.
Japanese Office Action issued Sep. 22, 1010 in corresponding Japanese Patent Application No. 2007-115824 (with English translation).

* cited by examiner

*Primary Examiner* — Tonia L. M. Dollinger
*Assistant Examiner* — Asghar Bilgrami
(74) *Attorney, Agent, or Firm* — Birch, Stewart, Kolasch & Birch, LLP

(57) ABSTRACT

The present invention realizes picture recording in simple configuration such that a user can easily and intuitively identify a minified picture of a multi-view picture from among minified pictures of pictures being taken. A 3-dimensional thumbnail picture is created by performing 3-dimensional CG processing on a multi-view picture thumbnail picture, and a thumbnail picture is created from a normal picture and recorded in association with a primary picture. The 3-dimensional CG thumbnail picture X is given a stereoscopic effect as a result of the 3-dimensional CG graphic processing so that the difference from a normal 2-dimensional thumbnail Y is clear at a glance. Consequently, a viewer can readily recognize the picture X as a minified picture of a multi-view picture without using a special apparatus to realize a graphical approach.

27 Claims, 19 Drawing Sheets

PICTURE PROCESSING APPARATUS, PICTURE RECORDING APPARATUS, METHOD AND PROGRAM THEREOF

BACKGROUND OF THE INVENTION

1. Field of the Invention

The present invention relates to display of a list of minified pictures of a multi-view picture and a single-view picture. The present invention also relates to recording of minified pictures of a multi-view picture and a single-view picture.

2. Description of the Related Art

In a general stereo picture display system, a picture drawn from a viewpoint of a right eye and a picture drawn from a viewpoint of a left eye are presented to a right eye and a left eye, respectively. Normally, in such two pictures from viewpoints of a right eye and a left eye (hereinafter, referred to as a multi-view picture), objects at a distant position from the viewpoints are viewed to be approximately same because the lines of sight from both eyes are approximately parallel so that the pictures are drawn at the approximately same position. On the contrary, objects at a near position to the viewpoints are viewed to be different because the lines of sight from both eyes are not parallel so that the pictures are drawn at different positions. When such a picture with parallax (hereinafter, referred to as a parallax picture) is viewed from a right eye and a left eye, an observer recognizes perspective to the object.

Approaches to generation of a parallax picture include a graphical approach of using two cameras at left and right to shoot a subject and showing a gained parallax picture in a 3-dimensional form using ocular deception, and 3-dimensional computer graphic (3-dimensional CG) display to generate a parallax picture by viewing transformation of model data from viewpoints of both left and right eyes using a computer graphic technique. The 3-dimensional computer graphic display is commonly referred to as virtual 3-dimensional display or pseudo 3-dimensional display.

In the graphical approach, a 3D monitor in the parallax barrier system or in the lenticular lens system is used for stereoscopic display of a parallax picture. In the parallax barrier system, a parallax barrier is produced that has a pattern in which a light transmission part and a light shielding part are alternately arranged in a parallax barrier display layer at a predetermined pitch, and striped picture pieces indicating left and right images are alternately arranged and displayed on a picture display surface being the lower layer, so that the parallax picture can be viewed stereoscopically.

Alternatively, in the graphical approach, a lenticular scheme using a lenticular lens sheet, an integral photography scheme using a micro lens array sheet, or a holography scheme using an interference phenomenon is employed, for example.

In general computer graphics, an object defined in a 3-dimensional space is represented as a group of a plurality of polygons (polygonal shapes). As a polygon, the simplest triangle is normally used. Coordinates of each polygon constituting the object is transformed from object coordinates of the polygon to 3-dimensional coordinates based on the position of a viewpoint of an observer, i.e., visual-field coordinates using a mathematical approach such as a vector or matrix. Further, for display on a display apparatus, coordinate transformation is performed for perspective projection of the polygon represented in the visual-field coordinates on a 2-dimensional plane (perspective transformation). Position data of the final polygon subjected to the series of coordinate transformations includes a value Z representing a distance from a viewpoint in a direction perpendicular to the display (Z-axis), a value X and a value Y representing position coordinates in the display surface.

A method of deciding the color value of a pixel constituting each polygon includes a method of arranging a virtual light source on visual-field coordinates, physically calculating the intensity of light radiated on each vertex constituting the polygon from the light source, and obtaining the light intensity of each pixel position in a rasterizing process in the polygon from the value by linear interpolation.

Alternatively, Japanese Patent Application Laid-Open No. 2002-24850 discloses a method of pasting a picture representing a texture or special pattern of the object surface called a texture to the polygon surface. In this method, position coordinates and texture coordinates are given to each vertex of a polygon constituting an object at a stage of object coordinates before coordinate transformation. Then, similarly to the above case using the light intensity, texture coordinates are linearly interpolated for each pixel position in a polygon rasterizing process, and the color value of the pixel is decided depending on the obtained texture coordinates.

The above procedure can generate a graphic picture from a particular viewpoint. However, to generate a parallax picture for stereoscopic vision as the above, a multi-view picture is generated by moving the viewpoint position to the positions of a right eye and a left eye and drawing the identical object for two times. An expensive system comprises a display apparatus which can realize a graphical approach as the above to generate a multi-view picture.

On the other hand, conventionally, if a storage apparatus stores both of a multi-view picture and a normal picture without parallax, a technique displays minified pictures of those pictures to be differentiated. Electronic equipment according to Japanese Patent Application Laid-Open No. 2004-120165 comprises a display apparatus which can realize a graphical approach. To display a list of thumbnail pictures in a plane, the apparatus adds a symbol "3D" to a thumbnail picture corresponding to a 3-dimensional picture and represents the picture in a circle or an ellipse. It adds a symbol "2D" to a thumbnail picture corresponding to a 2-dimensional picture and represents the picture in a triangle. In this way, it makes the thumbnail created from the 2-dimensional picture and the thumbnail created from the 3-dimensional picture to be differentiated.

Further, conventionally, an imaging method is proposed to improve a stereoscopic vision effect even if a subject is at long range. For example, according to Japanese Patent Application Laid-Open No. 2003-51872; camera units are provided on both edges of an open chassis, thereby improving an effect of a stereo picture even if a subject is at long range.

SUMMARY OF THE INVENTION

Japanese Patent Application Laid-Open No. 2004-120165 represents thumbnails of a 2-dimensional picture and a 3-dimensional picture by symbols such as "3D" or "2D" and a figure such as a circle, an ellipse or a triangle. However, it is difficult to intuitively differentiate the pictures.

Furthermore, according to Japanese Patent Application Laid-Open No. 2004-120165, a display apparatus is inevitably deployed which can realize display of a 3-dimensional picture by a graphical approach and display must be switched between a 2-dimensional picture and the 3-dimensional picture. As such, it has a drawback that it raises a cost of the entire system.

Particularly, the inevitable arrangement of such a special display apparatus in portable equipment such as a digital camera causes a serious problem in retention of the portability or control of a production cost.

Also, Japanese Patent Application Laid-Open No. 2003-51872 has a problem in that a subject at infinity cannot be given a stereoscopic vision effect.

Therefore, the present invention realizes picture recording in simple configuration such that a user can easily and intuitively identify a minified picture of a multi-view picture from among minified pictures of pictures being taken. The present invention also prevents recording of an ineffective multi-view picture without a stereo effect.

A picture processing apparatus according to the present invention comprises: a picture input unit which inputs pictures including a multi-view picture taken from two or more viewpoints and a single-view picture taken from a single viewpoint; a storage unit which stores a picture inputted to the picture input unit; a minified picture creation unit which creates a first minified picture produced by minifying a picture stored in the storage unit; a picture identification unit which identifies whether a picture stored in the storage unit is a multi-view picture or a single-view picture; a picture processing unit which creates a second minified picture by performing 3-dimensional computer graphic processing on the first minified picture corresponding to a picture identified by the picture identification unit to be the multi-view picture; and a display unit which in response to a direction to display a list of pictures stored in the storage unit, displays the first minified picture created by the minified picture creation unit in the list as a representative picture of pictures identified by the picture identification unit to be the single-view pictures and displays the second minified picture created by the picture processing unit in the list as a representative picture of pictures identified by the picture identification unit to be the multi-view pictures.

According to this invention, the list of the minified picture subjected to the 3-dimensional computer graphic processing as a representative picture of multi-view pictures and a simple minified picture as a representative picture of single-view pictures is displayed. The representative picture of the multi-view picture is subjected to the 3-dimensional computer graphic processing so that the difference from the simple minified picture can be clearly seen. Additionally, it is not necessary to use a special graphical approach to display a representative picture of multi-view pictures, making the cost low.

A picture processing apparatus according to the present invention comprises: a picture input unit which inputs pictures including a multi-view picture taken from two or more viewpoints and a single-view picture taken from a single viewpoint; a storage unit which stores a picture inputted to the picture input unit; a minified picture creation unit which creates a minified picture produced by minifying a picture stored in the storage unit; a picture identification unit which identifies whether a picture stored in the storage unit is a multi-view picture or a single-view picture; a face detection unit which detects whether or not a picture identified by the picture identification unit to be a multi-view picture contains a subject face region; and a display unit which, in response to a direction to display a list of pictures stored in the storage unit, displays the minified picture in the list as a representative picture of minified pictures of pictures identified by the picture identification unit to be single-view pictures and pictures which are identified by the picture identification unit to be multi-view pictures and from which no subject face region is detected by the face detection unit, and displays a predetermined sample minified picture applied with a 3-dimensional computer graphic in the list as a representative picture of pictures which are identified by the picture identification unit to be multi-view pictures and from which subject face regions are detected by the face detection unit.

According to this invention, the list of the pre-determined sample picture subjected to the 3-dimensional computer graphic processing as a representative picture of multi-view pictures containing detected faces and the simple minified picture as a representative picture of single-view pictures or multi-view pictures not containing a detected face is displayed. The pre-determined sample being the representative picture of multi-view pictures is subjected to the 3-dimensional computer graphic processing so that the difference between the representative picture of multi-view pictures containing faces and the simple minified picture can be clearly seen. Additionally, the pre-determined sample is used so that it is not necessary to perform the 3-dimensional computer graphic processing on individual multi-view pictures to display the representative picture of multi-view pictures.

A picture processing apparatus according to the present invention comprises: a picture input unit which inputs pictures including a multi-view picture taken from two or more viewpoints and a single-view picture taken from a single viewpoint; a storage unit which stores a picture inputted to the picture input unit; a minified picture creation unit which creates a minified picture produced by minifying a picture stored in the storage unit; a picture identification unit which identifies whether a picture stored in the storage unit is a multi-view picture or a single-view picture; a flash firing identification unit which identifies whether or not an electronic flash fired at the shooting for a picture identified by the picture identification unit to be a multi-view picture; and a display unit which, in response to a direction to display a list of pictures stored in the storage unit displays the minified picture in the list as a representative picture of pictures identified by the picture identification unit to be single-view pictures, displays the minified picture created by the minified picture creation unit in the list as a representative picture of pictures which are identified by the picture identification unit to be multi-view pictures and for which the flash firing identification unit identifies that an electronic flash did not fired, and displays a predetermined sample minified picture applied with a 3-dimensional computer graphic in the list as a representative picture of pictures which are identified by the picture identification unit to be multi-view pictures and for which the flash firing identification unit identifies that an electronic flash fired.

According to this invention, the list is displayed which contains the minified picture subjected to the 3-dimensional computer graphic processing as a representative picture of multi-view pictures for which an electronic flash fired at the shooting and the simple minified picture as a representative picture of single-view pictures or multi-view pictures for which an electronic flash did not fired at the shooting. The representative picture of multi-view pictures for which an electronic flash fired at the shooting is subjected to the 3-dimensional computer graphic processing so that the difference from the simple minified picture or the representative picture of multi-view pictures for which an electronic flash did not fired at the shooting can be clearly seen. Additionally, it is not necessary to use a special graphical approach to display the representative picture of multi-view pictures, making the cost low.

A face detection unit can be further comprised which detects whether or not a picture identified by the picture identification unit to be a multi-view picture contains a subject face region, wherein the picture processing unit can create the second minified picture by setting a region corresponding to the subject face region detected by the face detection unit in the first minified picture and performing the 3-dimensional computer graphic processing on the region being set; and among pictures identified by the picture identification unit to be multi-view pictures, the display unit can display the first minified picture in the list as a representative picture of pictures from which the face detection unit detects no subject face region and display the second minified picture in the list as a representative picture of pictures from which the face detection unit detects subject face regions.

The picture processing is performed only on a face being an important part so that less processing can display a substantial pseudo stereo picture as a representative picture.

A picture processing apparatus according to the present invention comprises: a picture input unit which inputs pictures including a multi-view picture taken from two or more viewpoints and a single-view picture taken from a single viewpoint; a storage unit which stores a picture inputted to the picture input unit; a minified picture creation unit which creates a first minified picture produced by minifying a picture stored in the storage unit; a picture identification unit which identifies whether a picture stored in the storage unit is a multi-view picture or a single-view picture; a distance identification unit which identifies whether a subject in a picture identified by the picture identification unit to be a multi-view picture is at long range or short range; a picture processing unit which creates a second minified picture by performing 3-dimensional computer graphic processing on the first minified picture created from a picture which is identified by the picture identification unit to be a multi-view picture and for which the distance identification unit identifies that the subject is at short range; and a display unit which, in response to a direction to display a list of pictures stored in the storage unit, displays the first minified picture created by the minified picture creation unit in the list as a representative picture of pictures identified by the picture identification unit to be single-view pictures, displays the first minified picture created by the minified picture creation unit in the list as a representative picture of pictures which are identified by the picture identification unit to be multi-view pictures and for which the distance identification unit identifies that the subject is at long range, and displays the second minified picture created by the picture processing unit in the list as a representative picture of pictures which are identified by the picture identification unit to be multi-view pictures and for which the distance identification unit identifies that the subject is at short range.

According to this invention, the 3-dimensional computer graphic processing is performed only on the multi-view picture containing a subject at short range so that it is not necessary to perform the relevant processing on a picture which contains a subject at long range and is ineffective even if the relevant processing is performed.

A picture processing method according to the present invention includes the steps of inputting pictures including a multi-view picture taken from two or more viewpoints and a single-view picture taken from a single viewpoint; storing an inputted picture; creating a first minified picture produced by minifying a stored picture; identifying whether a stored picture is a multi-view picture or a single-view picture; creating a second minified picture by performing 3-dimensional computer graphic processing on the first minified picture corresponding to a picture identified to be the multi-view picture; and in response to a direction to display a list of the stored pictures, displaying the first minified picture in the list as a representative picture of pictures identified to be the single-view pictures, and displaying the second minified picture in the list as a representative picture of pictures identified to be the multi-view pictures.

A picture processing method according to the present invention includes the steps of: inputting pictures including a multi-view picture taken from two or more viewpoints and a single-view picture taken from a single viewpoint; storing an inputted picture; creating a minified picture produced by minifying a stored picture; identifying whether a stored picture is a multi-view picture or a single-view picture; detecting whether or not the picture identified to be a multi-view picture contains a subject face region; and in response to a direction to display a list of the stored pictures, displaying a minified picture in the list as a representative picture of a minified picture of a picture identified to be the single-view picture and a picture which is identified to be the multi-view picture and from which the subject face region is not detected, and displaying a pre-determined sample minified picture applied with a 3-dimensional computer graphic in the list as a representative picture of a picture which is identified to be the multi-view picture and from which the subject face region is detected.

A picture processing method according to the present invention includes the steps of: inputting pictures including a multi-view picture taken from two or more viewpoints and a single-view picture taken from a single viewpoint; storing an inputted picture; creating a minified picture produced by minifying a stored picture; identifying whether a stored picture is a multi-view picture or a single-view picture; identifying whether or not an electronic flash fired at the shooting for a picture identified to be the multi-view picture; and in response to a direction to display a list of stored pictures, displaying a minified picture in the list as a representative picture of pictures identified to be the single-view pictures, displaying the minified picture in the list as a representative picture of pictures which are identified to be the multi-view pictures and for which it is identified that the electronic flash did not fired, and displaying a pre-determined sample minified picture applied with a 3-dimensional computer graphic in the list as a representative picture of pictures which are identified to be the multi-view pictures and for which it is identified that the electronic flash fired.

The method can further include the steps of detecting whether or not a picture identified to be the multi-view picture contains a subject face region; creating the second minified picture by setting a region corresponding to the subject face region in the first minified picture and performing 3-dimensional computer graphic processing on the region being set; and among pictures identified to be the multi-view pictures, displaying the first minified picture in the list as a representative picture of pictures from which the subject face region is not detected, and displaying the second minified picture in the list as a representative picture of pictures from which the subject face regions are detected.

A picture processing method according to the present invention includes the steps of: inputting pictures including a multi-view picture taken from two or more viewpoints and a single-view picture taken from a single viewpoint; storing an inputted picture; creating a first minified picture produced by minifying a stored picture; identifying whether a stored picture is a multi-view picture or a single-view picture; identifying whether a subject in a picture identified to be the multi-view picture is at long range or short range; creating a second minified picture by performing 3-dimensional computer graphic processing on the first minified picture created from a picture which is identified to be the multi-view picture and for which it is identified that the subject is at short range; and in response to a direction to display a list of the stored pictures, displaying the first minified picture in the list as a representative picture of pictures identified to be the single-view pictures, displaying the first minified picture in the list as a representative picture of pictures which are identified to be the multi-view pictures and for which it is identified that the subjects are at long range, and displaying the second minified picture in the list as a representative picture of pictures which are identified to be the multi-view pictures and for which it is identified that the subjects are at short range.

The present invention also includes a program causing a computer to execute the picture processing methods.

A picture recording apparatus according to the present invention comprises: a photographing unit which can take pictures including a multi-view picture taken from two or more viewpoints and a single-view picture taken from a single viewpoint; a primary picture storage unit which stores a primary picture being a multi-view picture or a single-view picture taken by the photographing unit; a picture identification unit which identifies whether a primary picture stored in the primary picture storage unit is a multi-view picture or a single-view picture; a picture processing unit which creates a first minified picture by minifying the primary picture and creates a second minified picture by and performing 3-dimensional computer graphic processing on the first minified picture created from the primary picture identified by the picture identification unit to be a multi-view picture; a minified picture storage unit which stores the first minified picture or the second minified picture created by the picture processing unit in response to the identification whether to be the multi-view picture or the single-view picture by the picture identification unit; and a recording unit which records the first minified picture or the second minified picture stored in the minified picture storage unit and the primary picture stored in the primary picture storage unit in association with each other.

According to this invention, the minified picture subjected to the 3-dimensional computer graphic processing as a minified picture of a multi-view picture and a simple minified picture as a minified picture of a single-view picture are each recorded in association with the primary picture. The minified picture of the multi-view picture has been subjected to the 3-dimensional computer graphic processing so that the difference from the simple minified picture can be clearly seen. Additionally, it is not necessary to use a special graphical approach to display the minified picture of the multi-view picture, realizing inexpensive apparatus configuration.

The apparatus can further comprise a face detection unit which detects whether or not the primary picture identified by the picture identification unit to be a multi-view picture contains a subject face region; wherein: the picture processing unit creates the second minified picture by setting a region corresponding to the subject face region detected by the face detection unit in the first minified picture and performing 3-dimensional computer graphic processing on the region being set.

Herein, the 3-dimensional computer graphic processing is performed only on a face being an important part so that the les processing can record a substantial pseudo stereo minified picture.

A picture recording apparatus according to the present invention comprises: a photographing unit which can take pictures including a multi-view picture taken from two or more viewpoints and a single-view picture taken from a single viewpoint; a primary picture storage unit which stores a primary picture being a multi-view picture or a single-view picture taken by the photographing unit; a picture identification unit which identifies whether a primary picture stored in the primary picture storage unit is a multi-view picture or a single-view picture; a flash firing identification unit which identifies whether or not an electronic flash fired for the picture identified by the picture identification unit to be a multi-view picture at the shooting; a picture processing unit which creates a first minified picture produced by minifying a primary picture which the picture identification unit identifies to be a single-view picture or for which the flash firing identification unit identifies that an electronic flash did not fired at the shooting; a sample minified picture obtaining unit which obtains a pre-determined sample minified picture applied with a 3-dimensional computer graphic as a second minified picture corresponding to the primary picture which the picture identification unit identifies to be a multi-view picture and for which the flash firing identification unit identifies that an electronic flash fired; a minified picture storage unit which stores the first minified picture created by the picture processing unit or the second minified picture obtained by the sample minified picture obtaining unit in response to the identification whether to be the multi-view picture or the single-view picture by the picture identification unit and the identification whether or not an electronic flash fired at the shooting by the flash firing identification unit; and a recording unit which records the first minified picture or the second minified picture stored in the minified picture storage unit and the primary picture stored in the primary picture storage unit in association with each other.

According to this invention, the pre-determined sample minified picture subjected to the 3-dimensional computer graphic processing as the minified picture of the multi-view picture for which an electronic flash fired at the shooting and a simple normal minified picture as the minified picture of a single-view picture or a multi-view picture for which an electronic flash did not fired at the shooting are recorded in association with the primary picture.

The sample minified picture of the multi-view picture for which an electronic flash fired at the shooting has been subjected to the 3-dimensional computer graphic processing so that the difference from the minified picture of the simple minified picture or the multi-view picture for which an electronic flash did not fired at the shooting can be clearly seen. Additionally, it is not necessary to use a special graphical approach or to perform the 3-dimensional computer graphic processing at each time of photographing to display the minified picture of the multi-view picture, realizing inexpensive apparatus configuration.

A picture recording apparatus according to the present invention comprises: a photographing unit which can take pictures including a multi-view picture taken from two or more viewpoints and a single-view picture taken from a single viewpoint, a primary picture storage unit which stores a primary picture being a multi-view picture or a single-view picture taken by the photographing unit a picture-identification unit which identifies whether a primary picture stored in the primary picture storage unit is a multi-view picture or a single-view picture; a face detection unit which detects whether or not a picture identified by the picture identification unit to be a multi-view picture contains a subject face region; a picture processing unit which creates a first minified picture produced by minifying the primary picture which the picture identification unit identifies to be a single-view picture or from which the face detection unit detects no subject face region; a sample minified picture obtaining unit which obtains a pre-determined sample minified picture applied with a 3-dimensional computer graphic as a second minified picture corresponding to the primary picture which the picture identification unit identifies to be a multi-view picture and from which the face detection unit detects a subject face region; a minified picture storage unit which stores the first minified picture created by the picture processing unit or the second minified picture obtained by the sample minified picture obtaining unit in response to the identification whether to be the multi-view picture or the single-view picture by the picture identification unit and whether or not the face detection unit detects the subject face region; and a recording unit which records the first minified picture or the second minified picture stored in the minified picture storage unit and the primary picture stored in the primary picture storage unit in association with each other.

According to this invention, the pre-determined sample minified picture as the minified picture of a multi-view picture containing a subject face region subjected to the 3-dimensional computer graphic processing and the simple normal minified picture as the minified picture of a single-view picture or a multi-view picture not containing a subject face region are recorded in association with the primary picture.

The sample minified picture of the multi-view picture containing a subject face region has been subjected to the 3-dimensional computer graphic processing so that the difference from the simple minified picture or the minified picture of the multi-view picture for which an electronic flash did not fired at the shooting can be clearly seen. Additionally, it is not necessary to use a special graphical approach or to perform the 3-dimensional computer graphic processing at each time of photographing to display the minified picture of the multi-view picture, realizing inexpensive apparatus configuration.

A picture recording apparatus according to the present invention comprises a photographing unit which can take pictures including a multi-view picture taken from two or more viewpoints and a single-view picture taken from a single viewpoint; a primary picture storage unit which stores a primary picture being a multi-view picture or a single-view picture taken by the photographing unit; a picture identification unit which identifies whether a primary picture stored in the primary picture storage unit is a multi-view picture or a single-view picture; a picture processing unit which creates a first minified picture by minifying the primary picture and creates a second minified picture by and performing 3-dimensional computer graphic processing on the first minified picture created from the primary picture which the picture identification unit identifies to be a multi-view picture and for which the distance identification unit identifies that a subject is at short range; a minified picture storage unit which stores the first minified picture or the second minified picture created by the picture processing unit in response to the identification whether to be the multi-view picture or the single-view picture by the picture identification unit and the identification of the distance of the subject by the distance identification unit; and a recording unit which records the first minified picture or the second minified picture stored in the minified picture storage unit and the primary picture stored in the primary picture storage unit in association with each other.

According to this invention, the 3-dimensional computer graphic processing is performed only on the multi-view picture containing a subject at short range so that it is not necessary to perform the relevant processing on a picture which contains a subject at long range and is ineffective even if the relevant processing is performed.

The recording unit preferably records only a primary picture for which the distance identification unit identifies that a subject is at short range among primary pictures identified by the picture identification unit to be multi-view pictures.

This can avoid the need to record a multi-view picture which contains a subject at longer range of a pre-determined distance or more and hardly has a stereo effect, or a multi-view picture which has no stereo effect, preventing ineffective picture recording.

The apparatus can further comprise a notification unit which notifies of an alert that a primary picture is not recorded which the picture identification unit identifies to be a multi-view picture and for which the distance identification unit identifies that a subject is at long range.

This can cause a user to recognize that a multi-view picture which contains a subject at long range and hardly has a stereo effect is not recorded.

A picture recording method according to the present invention includes the steps of: taking pictures including a multi-view picture taken from two or more viewpoints and a single-view picture taken from a single viewpoint; storing a taken primary picture being a multi-view picture or a single-view picture; identifying whether the stored primary picture is a multi-view picture or a single-view picture; creating a first minified picture by minifying the primary picture and creating a second minified picture by performing 3-dimensional computer graphic processing on the first minified picture created from the primary picture identified to be a multi-view picture; and storing the created first minified picture or second minified picture in response to the identification whether to be the multi-view picture or the single-view picture; and recording the first minified picture or second minified picture being stored and the stored primary picture in association with each other.

The picture recording method can further include the steps of: detecting whether or not the primary picture identified to be a multi-view picture contains a subject face region; and creating the second minified picture by setting a region corresponding to the detected subject face region in the first minified picture and performing 3-dimensional computer graphic processing on the region being set.

A picture recording method according to the present invention includes the steps of: taking pictures including a multi-view picture taken from two or more viewpoints and a single-view picture taken from a single viewpoint; storing a taken primary picture being a multi-view picture or a single-view picture; identifying whether the stored primary picture is a multi-view picture or a single-view picture; identifying whether or not an electronic flash fired for the picture identified to be a multi-view picture at the shooting; creating a first minified picture produced by minifying the primary picture which is identified to be the single-view picture or for which it is identified that an electronic flash did not fired at the shooting; obtaining a pre-determined sample minified picture applied with a 3-dimensional computer graphic as a second minified picture corresponding to the primary picture which is identified to be the multi-view picture and for which it is identified that the electronic flash fired; storing the first minified picture or the second minified picture in response to the identification whether to be the multi-view picture or the single-view picture and the identification whether or not an electronic flash fired at the shooting; and recording the first minified picture or second minified picture being stored and the stored primary picture in association with each other.

A picture recording method according to the present invention includes the steps of: taking pictures including a multi-view picture taken from two or more viewpoints and a single-view picture taken from a single viewpoint; storing a taken primary picture being a multi-view picture or a single-view picture; identifying whether the stored primary picture is a multi-view picture or a single-view picture; detecting whether or not the picture identified to be a multi-view picture contains a subject face region; creating a first minified picture produced by minifying the primary picture which is identified to be the single-view picture or from which the subject face region is not detected; obtaining a pre-determined sample minified picture applied with a 3-dimensional computer graphic as a second minified picture corresponding to the primary picture which is identified to be the multi-view picture and from which the subject face region is detected; storing the first minified picture or the second minified picture in response to the identification whether or not the multi-view picture or the single-view picture and whether or not the subject face region is detected; and recording the first minified picture or second minified picture being stored and the stored primary picture in association with each other.

A picture recording method according to the present invention includes the steps of: taking pictures including a multi-view picture taken from two or more viewpoints and a single-view picture taken from a single viewpoint; storing a taken primary picture being a multi-view picture or a single-view picture; identifying whether the stored primary picture is a multi-view picture or a single-view picture; identifying whether a subject in a picture identified to be the multi-view picture is at long range or short range; creating a first minified picture by minifying the primary picture and creating a second minified picture by performing 3-dimensional computer graphic processing on the first minified picture created from the primary picture which is identified to be the multi-view picture and for which it is identified that the subject is at short range; storing the first minified picture or second minified picture in response to the identification whether to be the multi-view picture or the single-view picture and the identification of the distance of the subject; and recording the first minified picture or second minified picture being stored and the stored primary picture in association with each other.

The picture recording apparatus preferably records only a primary picture for which it is identified that the subject is at short range among a plurality of the primary pictures identified to be the multi-view pictures.

Additionally, the picture recording apparatus preferably further includes a step of notifying an alert that the primary picture is not recorded which is identified to be the multi-view picture and for which it is identified that the subject is at long range.

The present invention also includes a program causing a computer to execute the picture recording methods.

According to the present invention, a list of pictures is displayed containing a picture subjected to the 3-dimensional computer graphic processing as a representative picture of multi-view pictures and a simple minified picture as a representative picture of single-view pictures, multi-view pictures not containing a detected face or multi-view pictures containing a subject at long range. A pre-determined sample being the representative picture of the multi-view pictures has been subjected to the 3-dimensional computer graphic processing so that the difference between a representative picture of multi-view pictures containing a face and the simple minified picture can be clearly seen. Additionally, it is not necessary to use a special graphical approach to display the representative picture of the multi-view pictures, making the cost low.

According to the present invention, a minified picture subjected to the 3-dimensional computer graphic processing, more preferably, a minified picture containing a subject face region subjected to the 3-dimensional computer graphic processing as a minified picture of a multi-view picture is recorded in association with the primary picture. On the other hand, a simple minified picture as a minified picture of a single view picture, a multi-view picture not containing a detected face or multi-view picture containing a subject at long range is recorded in association with a primary picture. The minified picture of the multi-view picture has been subjected to the 3-dimensional computer graphic processing so that the difference between the minified picture of the multi-view picture and the minified picture of the single-view picture can be clearly seen. Additionally, it is not necessary to use a special graphical approach to display the minified picture of the multi-view picture, realizing inexpensive apparatus configuration.

DETAILED DESCRIPTION OF THE PREFERRED EMBODIMENTS

First Embodiment

Figure 1:
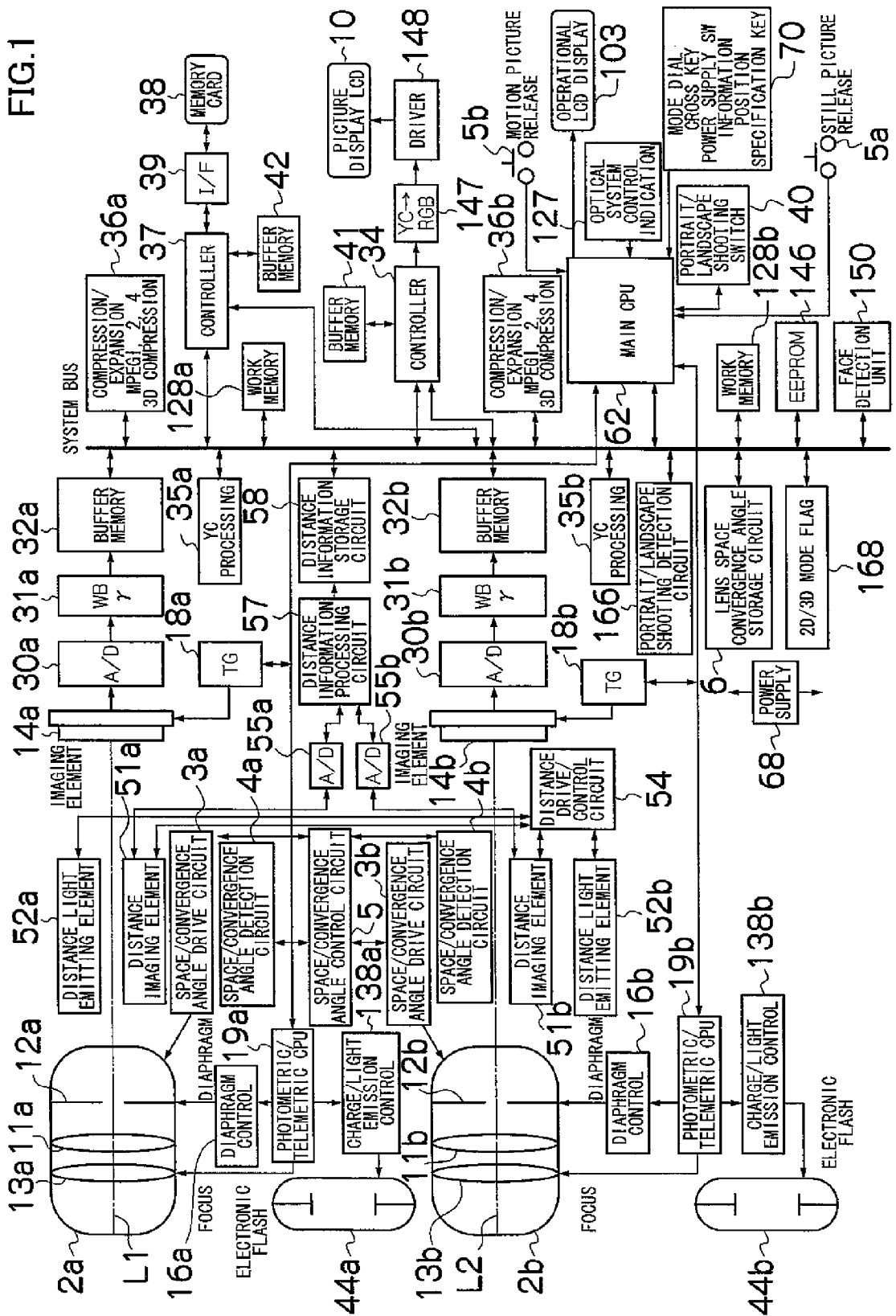
FIG. 1 is a block diagram of a camera.

FIG. 1 shows the electric configuration of a pantoscopic camera 1. Lens optical axes L1 and L2 of first and second imaging units 2a and 2b are arranged to be parallel or at a pre-determined angle to each other.

The first imaging unit 2a comprises a first zoom lens 11a, a first diaphragm 12a, a first focus lens 13a and a first image sensor 14a arranged along the lens optical axis L1. The first diaphragm 12a connects to a diaphragm control unit 16a, while the first image sensor 14a connects to a timing generator (TG) 18a. The operation of the first diaphragm 12a and the first focus lens 13a is controlled by a photometric/telemetric CPU 19a. The operation of the TG 18a is controlled by a main CPU 62.

The camera 1 is provided with an operation unit 70 for various operation when a user uses the camera 1. The operation unit 70 comprises a power supply switch which turns on the power supply to actuate the camera 1, a mode dial to select stereographic (3D) shooting, plane (2D) shooting, automatic shooting, manual shooting or the like, a cross key for various menu setting or selection or for zooming, a flash firing switch, and an information position specification key for execution or cancellation of a menu selected through the cross key. The appropriate operation on the operation unit 70 causes turning ON/OFF of the power supply, switching among various modes (a shooting mode or a playback mode, for example), zooming and the like.

The camera 1 also comprises the main CPU 62, an EEPROM 146, a YC/RGB converting unit 147 and a display driver 148. The main CPU 62 controls the entire camera 1. The EEPROM 146 stores individual data and programs specific to the camera 1, for example.

The YC/RGB converting unit 147 transforms a color video signal YC generated by YC processing units 35a and 35b to a three-color RGB signal and outputs the result to a picture display LCD 10 via the display driver 148.

The first zoom lens 11a moves the NEAR side (feeding side) or the INF side (renormalizing side) along the lens optical axis L1 to change the zoom magnification in response to zoom operation from an input operation unit 9. The movement is driven by a motor (not shown). The diaphragm 12a changes the aperture value (diaphragm value) during the AE (Auto Exposure) operation to restrain light flux and adjust exposure. The focus lens 13a is moved to the NEAR side or the INF side along the lens optical axis L1 during the AF (Auto Focus) operation to change a focusing position and adjust the focus. The movement is driven by the motor (not shown).

When the half-pressing of a still picture release switch 5a is detected, the main CPU 62 gains telemetric data from respective distance imaging elements 51a and 51b. The main CPU 62 adjusts the focus or a diaphragm based on the gained telemetric data, for example.

The first image sensor 14a receives light of a subject formed to an image by the first zoom lens 11a, the first diaphragm 12a and the first focus lens 13a and accumulates an electric charge of light depending on the amount of received light in a photo-acceptance element. The accumulation/transfer operation of an electric charge of light by the first image sensor 14a is controlled by the TG 18a, and a timing signal (clock pulse) inputted from the TG 18a decides an electronic shutter speed (light electric charge accumulation time). The first image sensor 14a obtains picture signals for a single screen in each pre-determined cycle in a shooting mode.

The second imaging unit 2b has the identical configuration to the first imaging unit 2a, i.e., comprises a second zoom lens 11b, a second diaphragm 12b, a second focus lens 13b and a second image sensor 14b connecting to a timing generator (TG) 14b. The operation of the components is controlled by the main CPU 62. The first imaging unit 2a and the second imaging unit 2b basically operate in cooperation, but they can also operate separately. A CCD or CMOS image sensor is used as the first and second image sensors 14a and 14b.

Imaging signals outputted from the first and second image sensors 14a and 14b are inputted to A/D converters 30a and 30b, respectively. The A/D converters 30a and 30b transform the inputted picture data from analog to digital. The imaging signals from the first image sensor 14a are outputted as first picture data (picture data for a right eye) and the imaging signals from the second image sensor 14b are outputted as second picture data (picture data for a left eye) through the A/D converters 30a and 30b.

Picture signal processing circuits 31a and 31b perform various picture processing such as gradation transformation, white balance correction or γ-correction processing on the first and second picture data inputted from the A/D converters 30a and 30b, respectively. Buffer memories 32a and 32b temporally store the first and second picture data subjected to various picture processing by the picture signal processing circuits 31a and 31b.

The photometric/telemetric CPUs 19a and 19b calculate an AF evaluated value and an AE evaluated value from the first and second picture data stored in the buffer memories 32a and 32b, respectively. An AF evaluated value, which is calculated by integrating high-frequency components in the brightness values of all regions or a pre-determined region (for example, the center part) of respective picture data, represents the sharpness of the picture. A high-frequency component in the brightness value is the sum of brightness differences (contrast) between neighboring pixels in a predetermined region. An AE evaluated value, which is calculated by integrating brightness values of all regions or a pre-determined region (for example, the center part) of respective picture data, represents the brightness of the picture. An AF evaluated value and an AE evaluated value are used in AF operation and AE operation executed in shooting preparation processing which will be discussed later, respectively.

The picture data stored in the buffer memories 32a and 32b is transformed to brightness signals (Y signals) and color difference signals (Cr and Cb signals) by the YC processing units 35a and 35b, respectively, and subjected to pre-determined processing such as gamma correction. The processed YC signals are stored in work memories 128a and 128b.

The YC signals of the first and second picture data stored in the work memories 128a and 128b are read out to the YC/RGB converting unit 147 by a controller 34. The YC/RGB converting unit 147 transforms the YC signals of the first and second picture data to video signals in a pre-determined scheme (for example, color compound video signals in the NTSC scheme) and combines the video signals into stereo picture data for stereoscopic display on the picture display LCD 10. If the LCD 10 is used as an electronic view finder in the shooting mode, the stereo picture data combined by the YC/RGB converting unit 147 is displayed as a through-the-lens picture on the LCD 10 via an LCD driver 148.

Compression/expansion processing circuits 36a and 36b perform compression processing on the first and second picture data stored in the work memories 128a and 128b, respectively, according to a pre-determined compression format such as JPEG for a still picture, and MPEG2, MPEG4 or H.264 for a motion picture. A media controller 37 records the respective picture data compressed by the compression/expansion processing circuits 36a and 36 in a memory card 38 and other recording media connected via an I/F 39.

To play back and display the first and second picture data recorded in the memory card 38 in the above way on the LCD 10, the respective picture data in the memory card 38 is read out by the media controller 37, expanded by the compression/expansion processing circuits 36a and 36b, transformed to stereo picture data by the YC/RGB converting unit 147, and then displayed as a playback picture on the LCD 10 via the LCD driver 148.

The LCD 10 is a normal plane monitor which does not employ graphical approach. It is used as an electronic view finder when a picture is taken, and displays picture data gained through shooting when a picture is played back.

The main CPU 62 controls the operation of the entire pantoscopic camera 1 in a unified manner. The main CPU 62 connects to the release switches 5a and 5b, the operation unit 70 and the EEPROM 146 being a non-volatile memory. The EEPROM 146 stores various control programs or setting information, for example. The main CPU 62 executes various processing based on the programs or setting information.

The main CPU 62 also connects to an optical system control directing unit 127. In response to zoom operation on the optical system control directing unit 127, shooting magnifications of the first imaging unit 2a and the second imaging unit 2b are modified.

The release switches 5a and 5b can be pressed in two stages. When the release switches 5a and 5b are lightly pressed (half-pressing) in the shooting mode, AF operation and AE operation are performed and shooting preparation is processed. When the release switches 5a and 5b are further strongly pressed (complete-pressing) in the above state, shooting processing is performed and first and second picture data: for a single screen is transferred from a frame memory 32 to the memory card 38 and recorded in the card 38.

The AF operation is performed through that the main CPU 62 controls the first and second focus lenses 13a and 13b and moves them in pre-determined directions and obtains the maximum value of AE evaluated values calculated from each of first and second picture data being sequentially gained. The AE operation is performed by setting aperture values of the first and second diaphragms 12a and 12b and electronic shutter speeds of the first and second image sensors 14a and 14b based on the calculated AE evaluated value after the AF operation is completed.

The camera 1 also comprises an operation LCD display 103 to assist the operation.

The camera 1 is configured such that a power supply battery 68 can be attached/detached. The power supply battery 68 is a secondary battery which can be charged, e.g., a nicad battery, a nickel hydride battery or a lithium ion battery. The power supply battery 68 can be a single-use primary battery, e.g., a lithium battery or an alkali battery. The power supply battery 68 is equipped in a battery storage room (not shown) so that if is electrically connected to each circuit of the camera 1.

The first imaging unit 2a and the second imaging unit 2b comprise space/convergence angle detection circuits 4a and 4b which detect a space/convergence angle formed by the first imaging unit 2a and the second imaging unit 2b, a lens space/convergence angle storage circuit 6 which stores the convergence angle detected by the space/convergence angle detection circuits 4a and 4b, space/convergence angle drive circuits 3a and 3b which rotate expansion and contraction of the base line length and an optical axis by a driving motor to change the convergence, respectively.

The camera 1 also comprises a space/convergence angle control circuit 5 which controls a change of the convergence angle by the space/convergence angle drive circuits 3a and 3b based on the space/convergence angle detected by the space/convergence angle detection circuits 4a and 4b.

Charge/light emission control units 138a and 138b are supplied with electric power from the power supply battery 68 to cause electronic flashes 44a and 44b to emit light to charge a flash firing condenser (not shown) or control light emission by the electronic flashes 44a and 44b, respectively.

The charge/light emission control units 138a and 138b control supply of electric current to the electronic flashes 44a and 44b in response to capturing various signals such as half-pressing/complete-pressing operation signals of the release switches 5a and 5b, or a signal indicating the amount of light emission and light emission timing from the main CPU 62 or the photometric/telemetric CPUs 19a and 19b, and control such that they can gain a desired amount of light emission at a desired time.

A portrait/landscape shooting switch button 40 is a button to direct that portrait shooting or landscape shooting should be performed. A portrait/landscape shooting detection circuit 166 detects which of portrait shooting or landscape shooting is to be performed according to the state of the button.

In a 2D/3D mode switch flag 168, a flag is set representing a 2D mode or a 3D mode depending on setting operation of a 3D shooting mode/2D shooting mode.

Distance light emitting elements 52a and 52b consist of a light emitting diode (LED) to irradiate a floodlighting spot to the identical subject grasped by the first imaging unit 2a and the second imaging unit 2b.

The distance imaging elements 51a and 51b are imaging elements dedicated to measure a distance which obtain a subject image of which floodlighting spot is irradiated by the distance light emitting elements 52a and 52b.

A distance drive/control circuit 54 controls to synchronize light emission timing by the distance light emitting elements 52a and 52b and distance imaging elements 53a and 53b.

Analog picture signals gained through imaging operation by the distance imaging elements 53a and 53b are transformed to digital picture data by telemetric A/D converting units 55a and 55b, respectively, and outputted to a distance information processing circuit 57.

The distance information processing circuit 57 calculates the distance to a subject grasped by the first imaging unit 2a and the second imaging unit 2b from the inputted digital picture data. This is based on the so-called trigonometric distance surveying principle. The distance information calculated by the distance information processing circuit 57 is recorded in a distance information storage circuit 58.

A face detection unit 150 detects a face region being a region including the face part of a subject person from picture data stored in the buffer memory 32a or the buffer memory 32b or picture data stored in a buffer memory 42.

A method of detecting a face region is not particularly limited and various methods can be employed, for example, a technique disclosed in Japanese Patent Application Laid-Open No 9-101579 by the applicant can be applied. The technique determines whether or not the hue of each pixel of a taken picture is included in the range of a flesh color to divide the picture into a flesh color region and a non-flesh color region and detects the edge in the picture to classify each point in the picture into an edge part or a non-edge part. Then, it extracts a region consisting of pixels that is positioned within the flesh color region and classified as the non-edge part and surrounded by pixels determined to be the edge part as a face candidate region, determines whether or not the extracted face candidate region is a region corresponding to a face of a person, and detects the region as the face region based on the determination result. Additionally, methods disclosed in Japanese Patent Application Laid-Open No. 2003-209683 and Japanese Patent Application Laid-Open No. 2002-199221 can also detect a face region.

A multi-view picture is not necessarily obtained by the pantoscopic camera 1 discussed in the above, but can be obtained through continuous shooting by a motion stereo method with a monocular camera.

Figure 2:
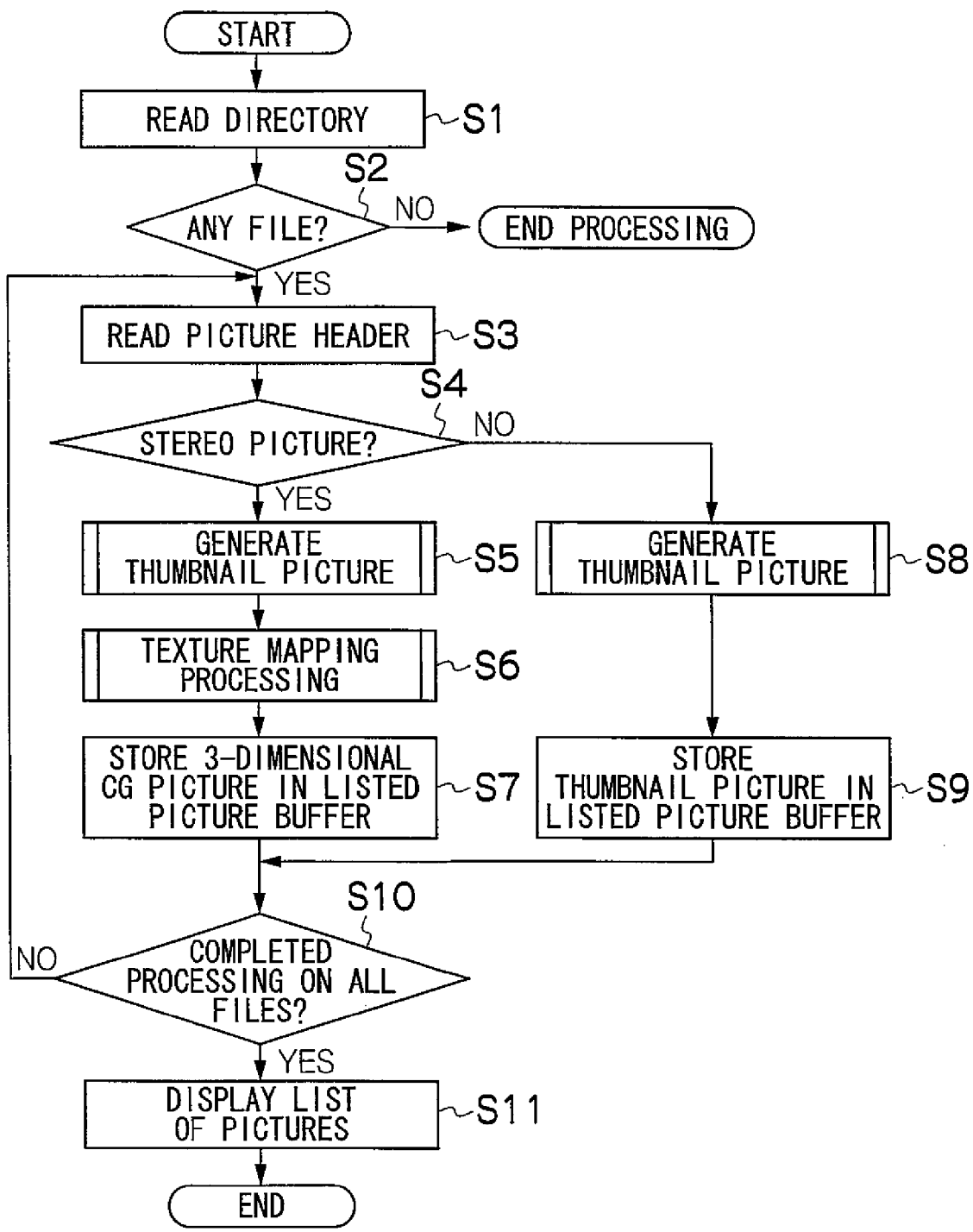
FIG. 2 is a flowchart of listed picture display processing according to a first embodiment.

The following will describe the flow of listed picture display processing executed by the main CPU 62 with reference to a flowchart in FIG. 2. A program defining the processing is stored in the EEPROM 146. In response to a direction "display thumbnail picture list" by the operation unit 70, the processing is collectively performed on all multi-view pictures stored in the memory card 38.

At S1, a directory of the memory card 38 is read.

At S2, it is judged whether or not there is a picture file in the relevant directory. If there is a picture file, the flow proceeds to S3. If there is no picture file, the processing ends.

At S3, the header part of the picture file is read out. Then, it is judged whether or not identification information is sensed that the picture file stores a multi-view picture. If the file stores a multi-view picture, the flow proceeds to S5; if it stores a normal picture the flow proceeds to S8.

At S5, a thumbnail picture is created from the multi-view picture stored in the picture file. Specifically, the picture can be created by thinning out only a picture for a left eye, only a picture for a right eye, or the both, as in the paragraph 0040 in Japanese Patent Application Laid-Open No. 2004-120165.

Figure 3:
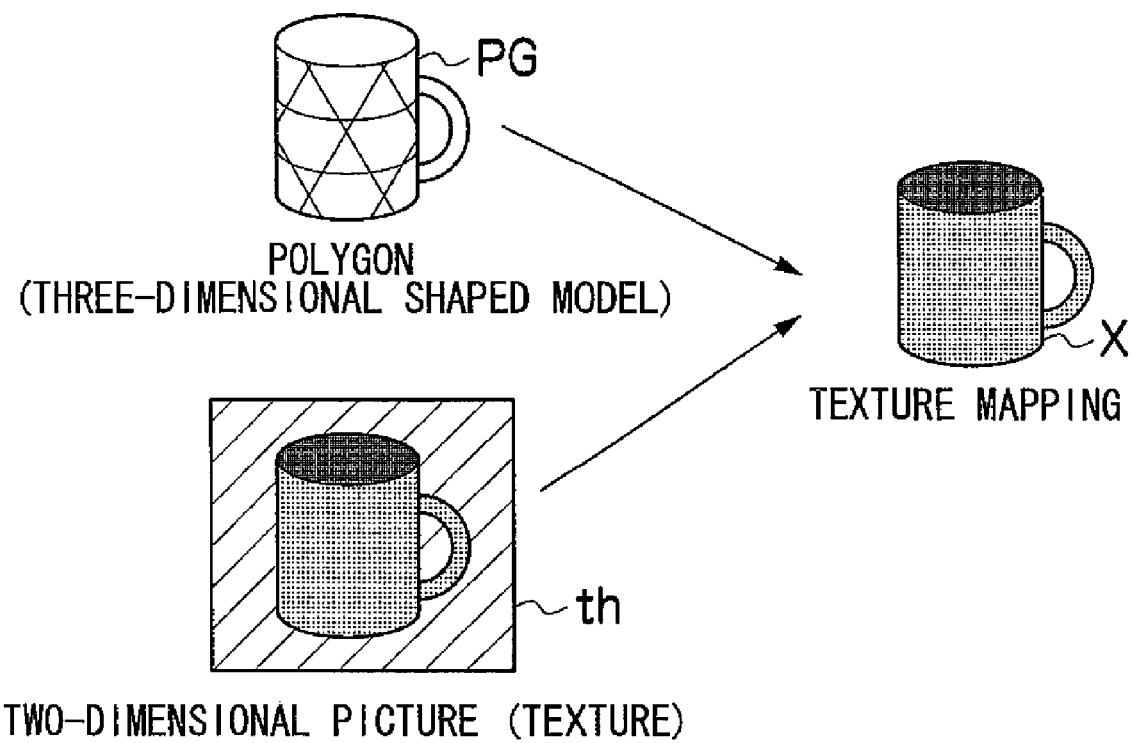
FIG. 3 is a diagram showing one example of texture mapping.

At S6, a 3-dimensional thumbnail picture is created by performing 3-dimensional CG processing on the created thumbnail picture. For example, as shown in FIG. 3, texture mapping is performed to paste a corresponding region of a thumbnail picture th to a polygon PG of a 3-dimensional shaped model corresponding to a primary subject and other various objects (FIG. 3 shows a mug, but it can be a person, etc.) in the picture to gain a 3-dimensional CG thumbnail picture X. The specific approach is similar to Japanese Patent Application Laid-Open No. 2002-24850. Alternatively, a 3-dimensional CG thumbnail picture can be created by performing the 3-dimensional CG processing on the original multi-view picture and thinning out the picture. However, the method of creating a thumbnail first is better in a processing load.

Other 3D computer graphic approaches can also be applied to a thumbnail picture to create a 3-dimensional CG thumbnail picture.

At S7, the created 3-dimensional CG thumbnail picture is stored in a listed picture buffer retained in a buffer memory 41.

At S8, a thumbnail picture is created from a normal single-viewpoint picture stored in the picture file. Specifically, it can be created by thinning out a single-view picture similarly to a normal thumbnail picture. Such a thumbnail is referred to as a normal thumbnail picture.

At S9, the created normal thumbnail picture is stored in the listed picture buffer retained in the buffer memory 41.

At S10, it is judged whether or not 3-dimensional CG thumbnail pictures or normal thumbnail pictures have been created for all pictures in the memory card 38. If the pictures have been created, the flow proceeds to S11; if the creation has not been finished, the flow returns to S3 to continue the creation.

At S11, a list of the 3-dimensional CG thumbnail pictures and normal thumbnail pictures in the buffer memory 41 is displayed on the LCD 10. The order in the list can be the order of names of the picture files from which the thumbnail pictures were created or the order of recording dates and times. That is, the 3-dimensional CG thumbnail pictures and normal thumbnail pictures are not differentiated but the 3-dimensional CG thumbnail-pictures and normal thumbnail-pictures are mixed and arranged in a screen of the LCD 10.

The processing at S3 to S9 can be performed each time a new picture is recorded.

Figure 4:
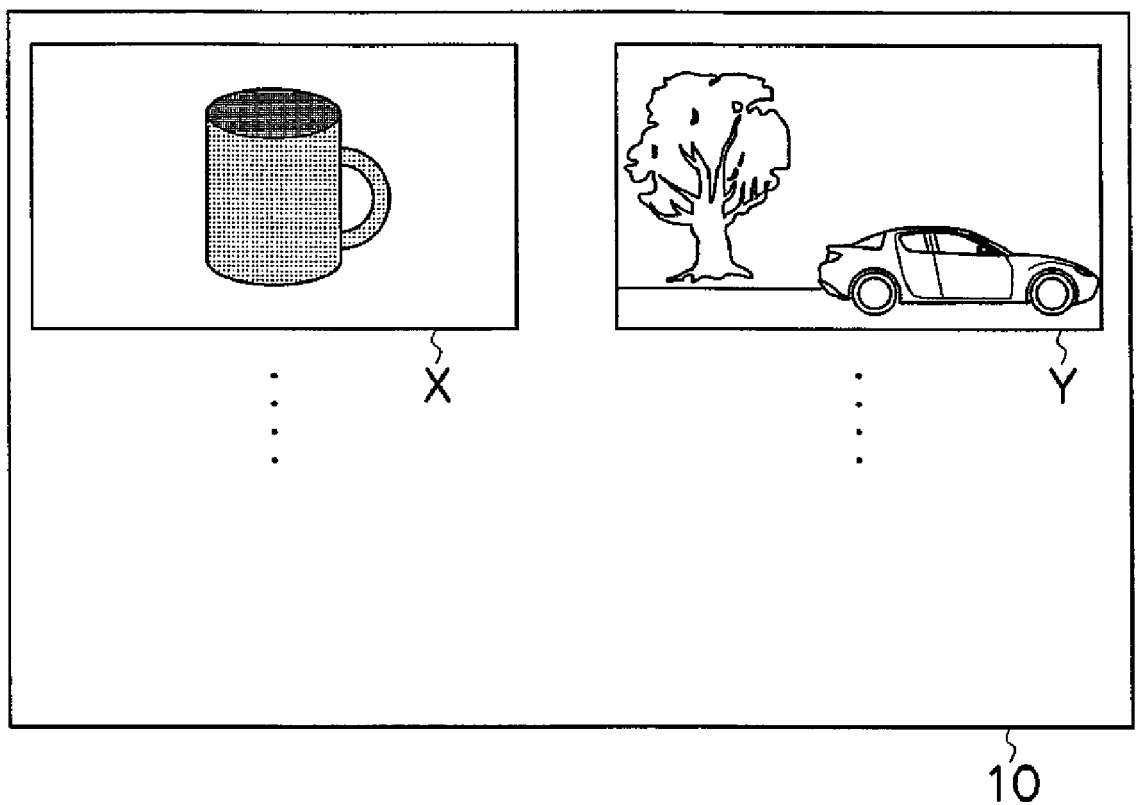
FIG. 4 is a diagram showing one example of thumbnails displayed by the listed picture display processing according to the first embodiment.

FIG. 4 shows one example of the 3-dimensional CG thumbnail picture X and a normal thumbnail picture Y being displayed in a list on the LCD 10. The 3-dimensional CG thumbnail picture X is given a stereoscopic effect as a result of the 3-dimensional CG graphic processing so that the difference from the normal thumbnail Y is clear at a glance. Consequently, a viewer can readily recognize the picture X as a minified picture of a multi-view picture without using a special apparatus to realize a graphical approach.

Second Embodiment

Figure 5:
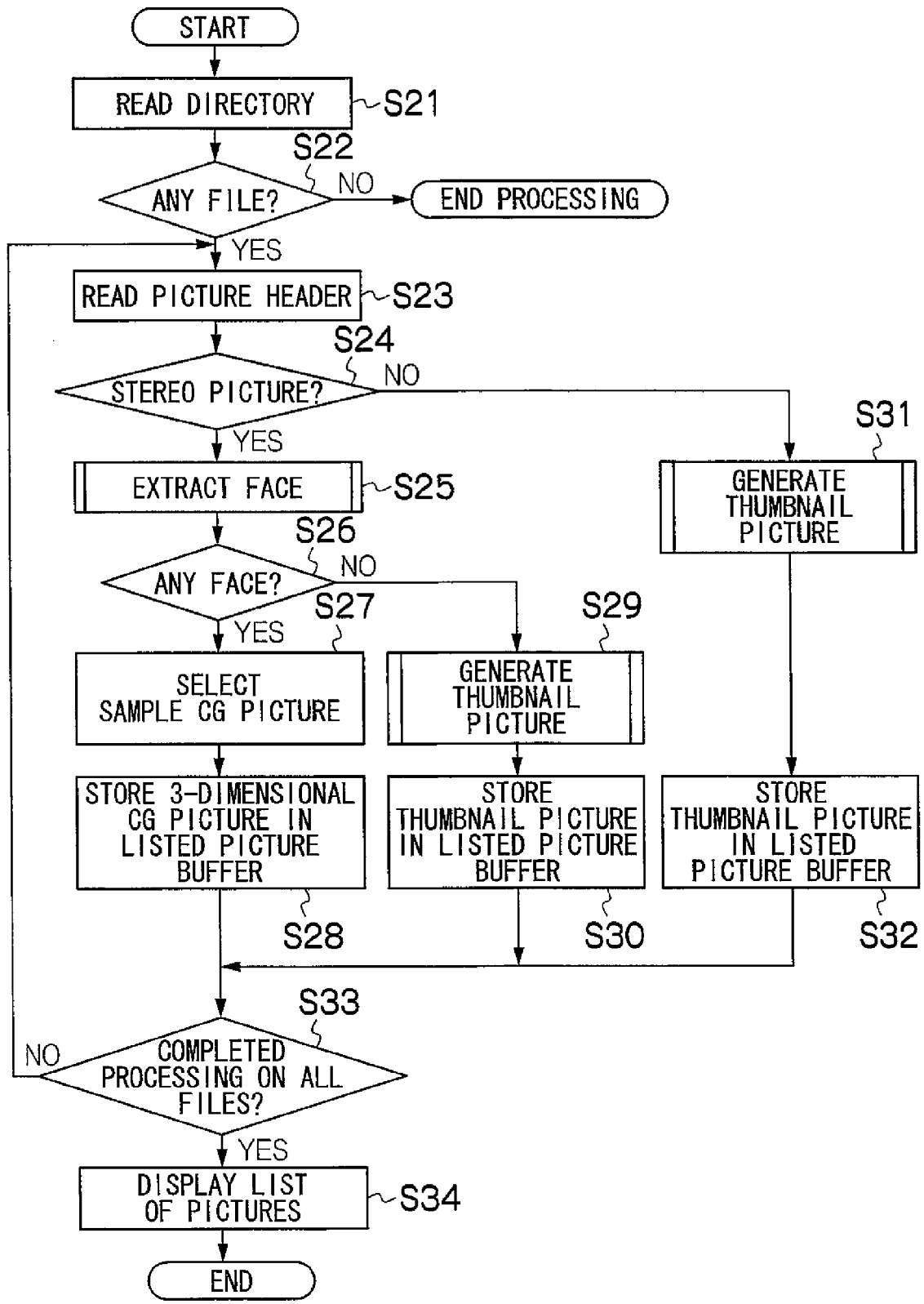
FIG. 5 is a flowchart of listed picture display processing according to a second embodiment.

FIG. 5 shows another example of the listed picture display processing executed by the main CPU 62. Herein, thumbnail pictures of multi-view pictures containing faces being taken are replaced to special samples.

S21 to S24 are similar to S1 to S4.

At S25, the face detection unit 150 is instructed to extract faces from one or both of the multi-view pictures. In response to the instruction from the main CPU 62, the face detection unit 150 attempts to detect a face region from a picture for a left eye or a picture for a right eye stored in a picture file.

At S26, it is judged whether or not the face detection unit 150 can detect a face region. If a face region can be detected, the flow proceeds to S27; if a face region cannot be detected, the flow proceeds to S29.

At S27, a sample 3-dimensional thumbnail picture which symbolizes being a multi-view picture containing a face being shot is retrieved from the EEPROM 146.

At S28, the retrieved sample is stored in a listed picture buffer. A sample 3-dimensional thumbnail picture does not need to be identical to a face of an actual subject, but can be a face of a sample person, whose face and body have been previously given a stereo effect due to a 3D graphic.

S29 is similar to S5 in the above. At S30, the thumbnail picture created at S29 is stored in the listed picture buffer. Such a thumbnail picture is referred to as a minified picture of a stereo picture and differentiated from a normal thumbnail picture.

S31 to S34 are similar to S8 to S11 in the above.

Figure 6:
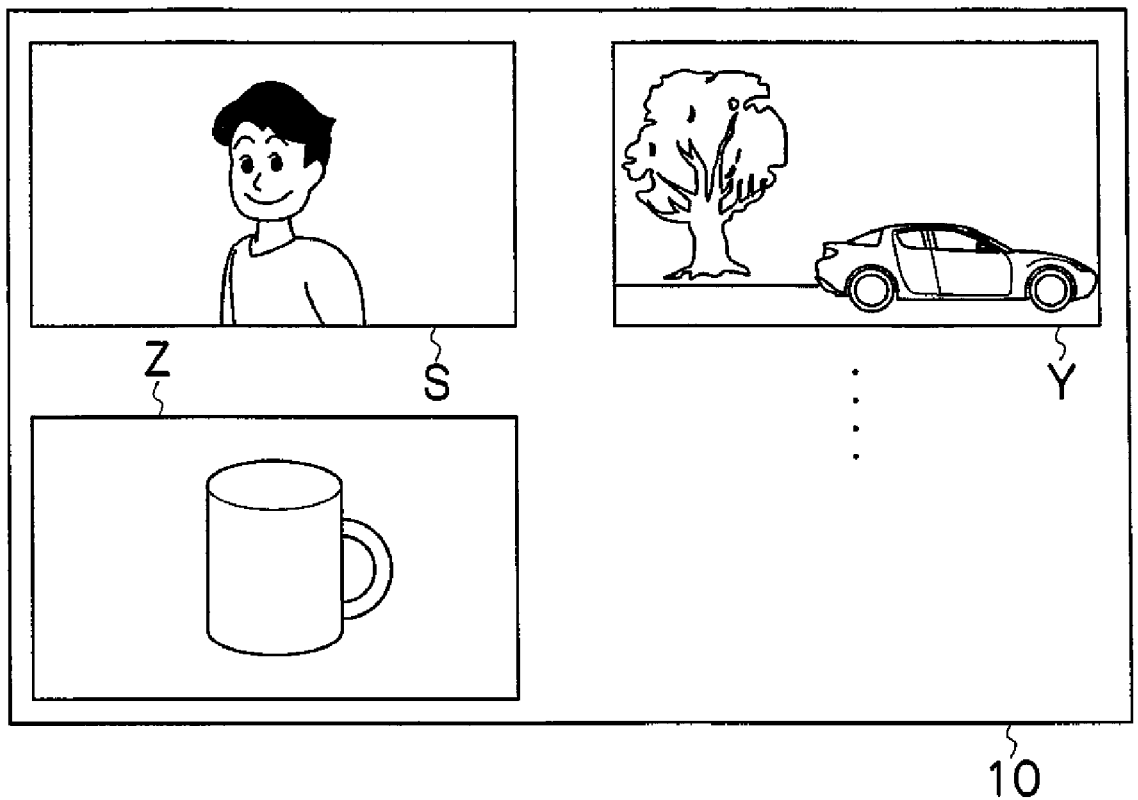
FIG. 6 is a diagram showing one example of thumbnails displayed by the listed picture display processing according to the second embodiment.

FIG. 6 shows one example of a list of a sample 3-dimensional thumbnail picture S and the normal thumbnail picture Y being displayed on the LCD 10 as a result of the execution of S34.

The sample thumbnail picture S has been subjected to the 3-dimensional CG graphic processing so that the difference from the normal thumbnail Y or a minified picture Z of a stereo picture is clear at a glance, facilitating identification of a stereo picture containing a face as a subject.

Third Embodiment

Figure 7:
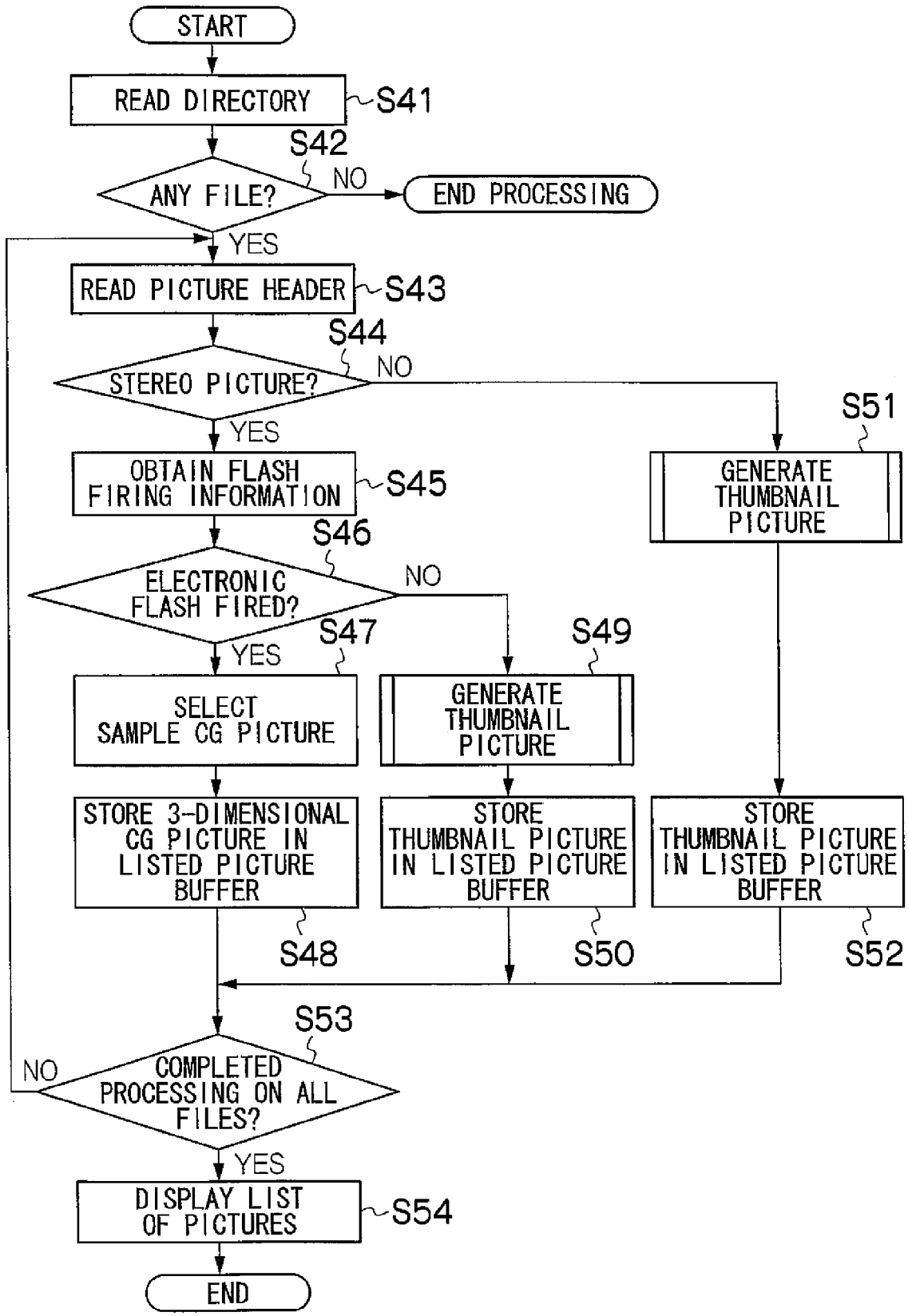
FIG. 7 is a flowchart of listed picture display processing according to a third embodiment.

FIG. 7 shows another example of the listed picture display processing executed by the main CPU 62. Herein, thumbnail pictures of flash multi-view pictures are replaced to special samples.

S41 to S44 are similar to S1 to S4.

At S45, flash firing information is obtained from a picture file to identify the ON or OFF state of the electronic flashes 44a and 44b at the picture recording. The flash firing information is, for example, information stored in a "Flash" tag of an Exif file.

At S46, the ON or OFF state of the electronic flashes 44a and 44b is judged at the shooting based on the flash firing information. If the electronic flashes 44a and 44b are at the ON state at the shooting, the flow proceeds to S47; if they are at the OFF state, the flow proceeds to S49.

At S47, a sample 3-dimensional thumbnail picture to symbolize to be a multi-view picture is retrieved from the EEPROM 146. The sample is given a stereo effect due to the 3-dimensional CG processing similarly to the second embodiment. A pattern of the sample does not need to be a face of a particular person.

At S48, the retrieved sample 3-dimensional thumbnail picture is stored in the listed picture buffer. The sample 3-dimensional thumbnail picture does not need to be identical to a face of an actual subject, but is a thumbnail picture that displays a face of a person is shot in a 3D graphic.

S49 to S54 are similar to S29 to S34 in the above.

Figure 8:
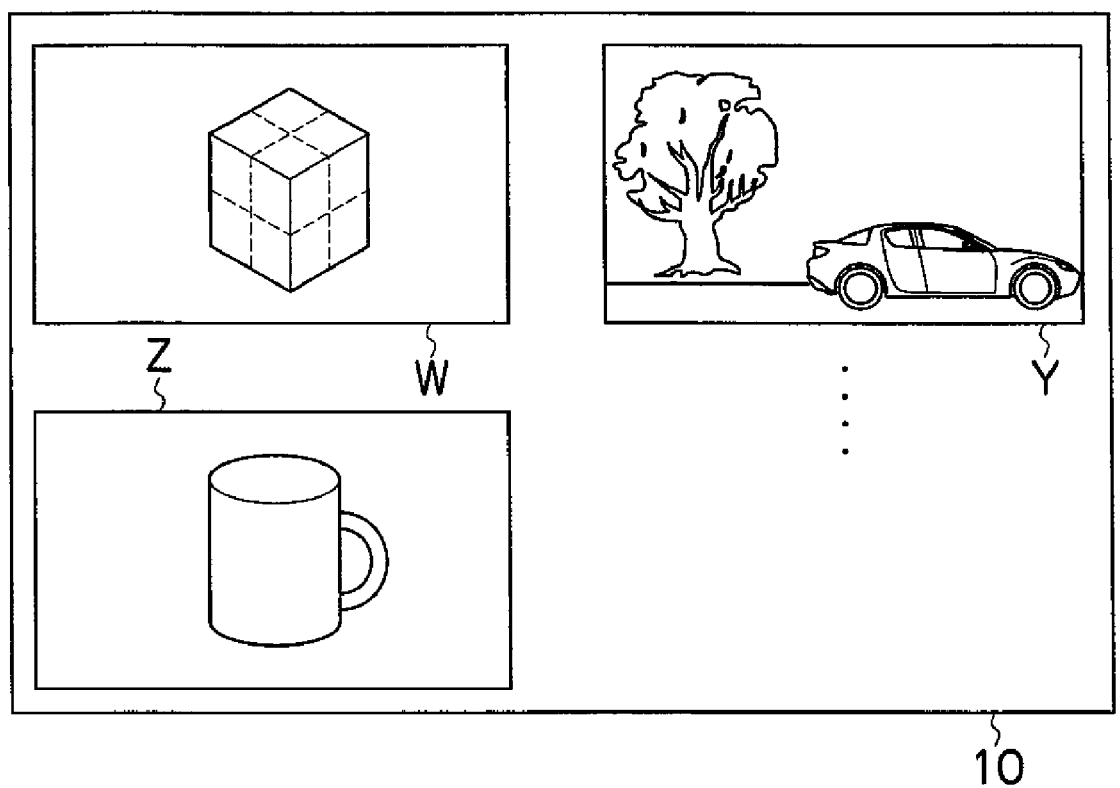
FIG. 8 is a diagram showing one example of thumbnails displayed by the listed picture display processing according to the third embodiment.

FIG. 8 shows one example of a list of a sample 3-dimensional thumbnail picture W and the normal thumbnail picture Y being displayed on the LCD 10 as a result of the execution of S54.

The sample thumbnail picture W has been subjected to the 3-dimensional CG processing so that the difference from the normal thumbnail Y or the minified picture Z of a stereo picture is clear at a glance, facilitating identification of a stereo picture containing a face as a subject.

Additionally, the sample display does not need to be uniformly performed even on a dark picture which is difficult to be efficiently used as a multi-view picture, improving the efficiency of processing.

Fourth Embodiment

Figure 9:
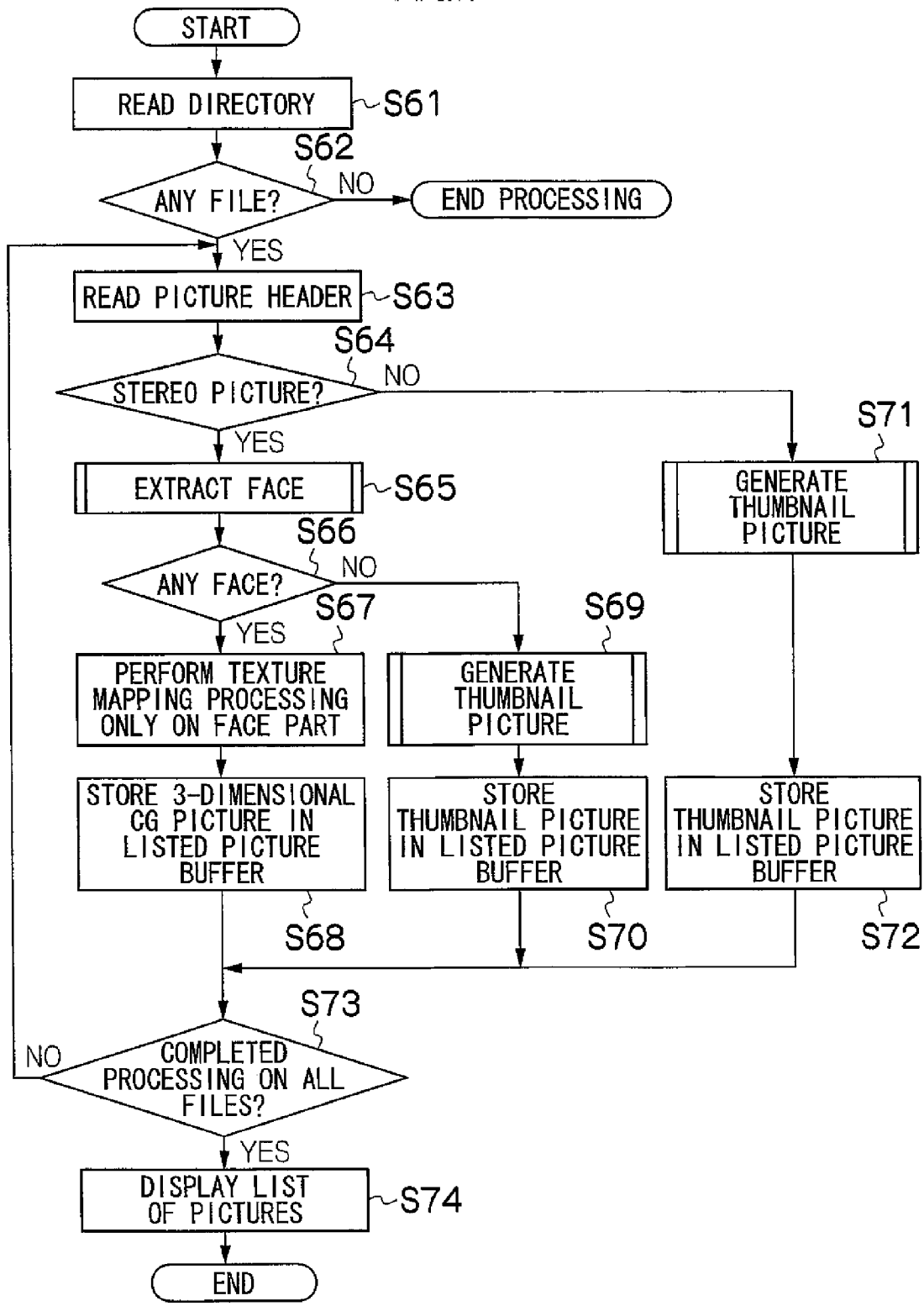
FIG. 9 is a flowchart of listed picture display processing according to a fourth embodiment.

FIG. 9 shows another example of the listed picture display processing executed by the main CPU 62. Herein, thumbnail pictures of multi-view pictures containing face being shot are replaced to thumbnail pictures subjected to the 3-dimensional CG processing for only face regions of the relevant multi-view pictures.

S61 to S66 are similar to S21 to S26. However, at S66, if it is judged that there is a face, the flow proceeds to S67; if it is judged that there is no face, the flow proceeds to S69.

At S67, a face region is extracted from a multi-view picture containing a face being shot, and the 3-dimensional CG processing is performed on the face region. This extracts a face region from the multi-view picture containing a face being shot and thins out the relevant multi-view picture at a pre-determined thinning-out rate, for example. A region corresponding to the face region extracted from the original multi-view picture is set in the thinned out minified picture. Then, texture mapping is performed to create a polygon specific to a face within the setting region and paste the thinned out face region to the relevant polygon, a thumbnail picture is gained that has been subjected to the 3-dimensional CG processing only on the face region. In this scheme, the 3-dimensional CG processing is performed after the creation of a thinned out picture.

Alternatively, texture mapping is performed to create a polygon specific to the person's face from the detected face itself and paste the face region to the relevant polygon, and a virtual CG picture is created that has been subjected to the 3-dimensional CG processing only on the face region of the multi-view picture. Then, the virtual CG picture is thinned out at a pre-determined thinning-out rate and a thumbnail picture is gained that has been subjected to the 3-dimensional CG processing only on the face region. The scheme creates a thinned out picture after the 3-dimensional CG processing.

The above texture mapping scheme needs to start from the polygon creation, hence the processing load is heavy to create an accurate polygon. A simple method of creating a polygon includes the following. First, configuration parts of a face are detected such as the contour of the face, eyes, a nose, a mouth from a detected face region, and polygon parting lines are decided depending on the positions of the detected configuration parts of a face. For example, the polygon parting lines are a line from the central part (glabella) between both eyes to the nose edge along the nasalis, a line circling both eyes, a line circling a mouth, and the contour of a face. By performing texture mapping on the polygons, a simple 3-dimensional CG thumbnail picture is gained that includes rising mouth and nose parts and sunken surroundings of eyes.

At S68, the created 3-dimensional CG thumbnail picture is stored in the listed picture buffer.

S69 to S74 are similar to S29 to S34 in the above.

Figure 10:
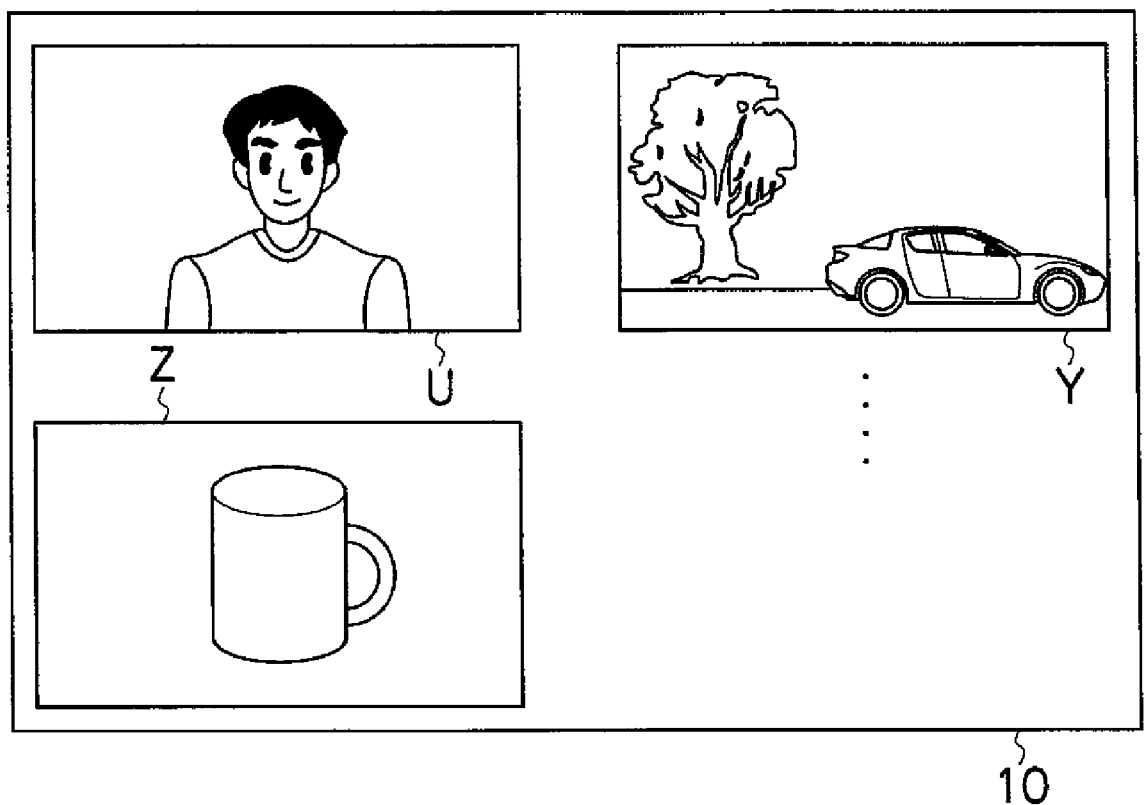
FIG. 10 is a diagram showing one example of thumbnails displayed by the listed picture display processing according to the fourth embodiment.

FIG. 10 shows one example of a list of a 3-dimensional thumbnail picture S, the normal thumbnail picture Y corresponding to a multi-view picture containing a detected face and the thumbnail picture Z corresponding to a multi-view picture not containing a detected face that is displayed on the LCD 10 as a result of the execution of S74.

A sample thumbnail picture U has been subjected to the 3-dimensional CG graphic processing only on the face region so that the difference from the normal thumbnail Y or the minified picture Z of a simple viewpoint picture is clear at a glance, facilitating identification of a stereo picture containing a face as a subject. Additionally, the 3-dimensional CG graphic processing has been performed on the face region using the original picture, hence the face outline of the original picture can be stereoscopically seen.

Fifth Embodiment

Figure 11:
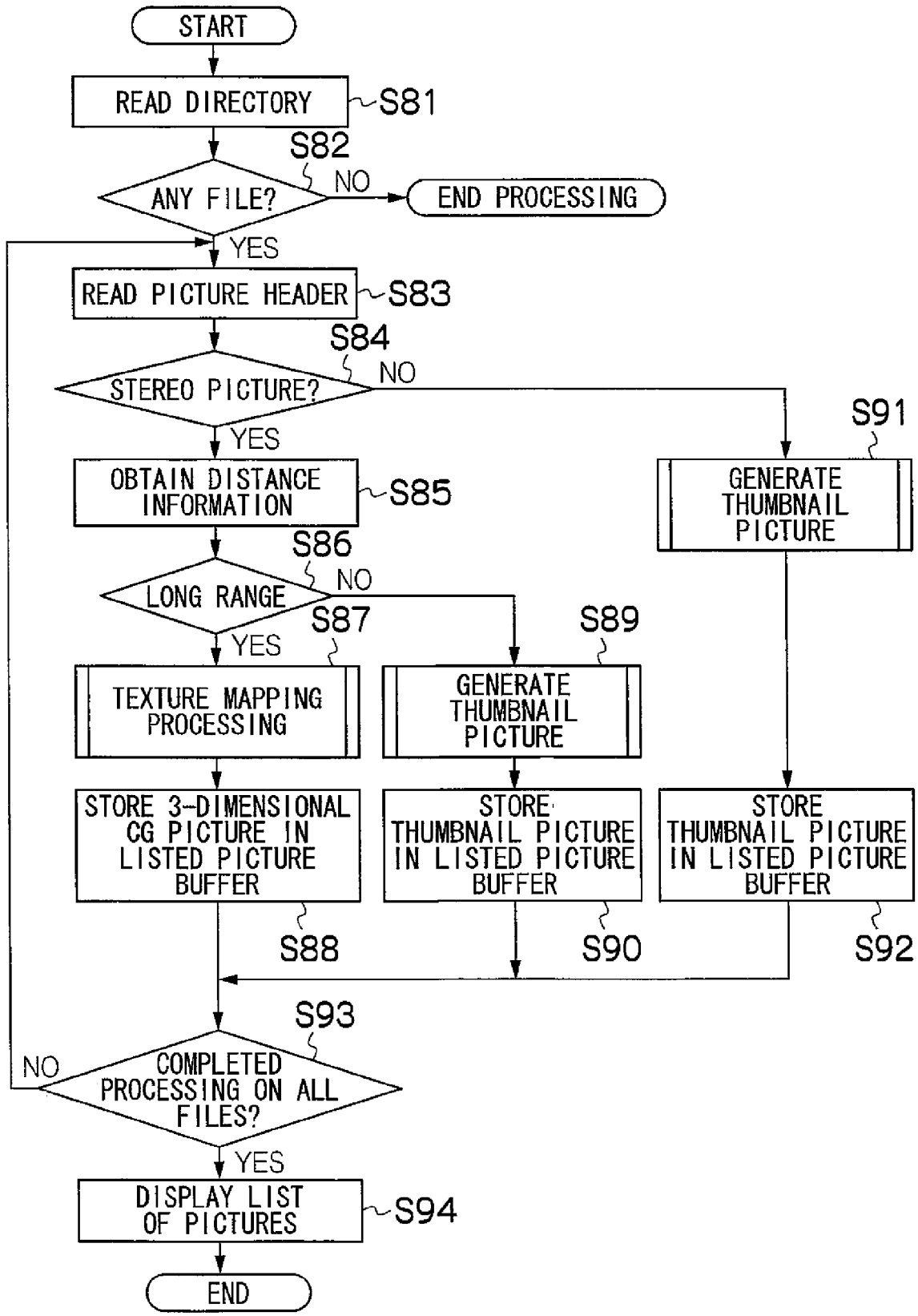
FIG. 11 is a flowchart of listed picture display processing according to a fifth embodiment.

FIG. 11 shows another example of the listed picture display processing executed by the main CPU 62. Herein, the 3-dimensional CG processing is performed only on a thumbnail picture of a multi-view picture containing a subject at short range being shot.

S81 to S84 are similar to S41 to S44.

At S85, distance information is obtained from a picture file to identify the distance from the camera 1 to the subject at the picture recording. The distance information is, for example, information stored in a "SubjectDistance" tag of an Exif file, and is stored in a distance information storage circuit 58.

At S86, it is judged based on distance information D whether or not the subject was at a more distant position than a pre-determined distance (for example, D>10 m).

If the subject is at a longer range, the flow proceeds to S89; if it is not at a longer range, i.e., at a shorter range, the flow proceeds to S87.

At S87, a 3-dimensional CG thumbnail picture is created similarly to S6.

At S88, the created 3-dimensional CG thumbnail picture is stored in the listed picture buffer retained in the buffer memory 41.

S89 to S94 are similar to S69 to S74 in the above.

Figure 12:
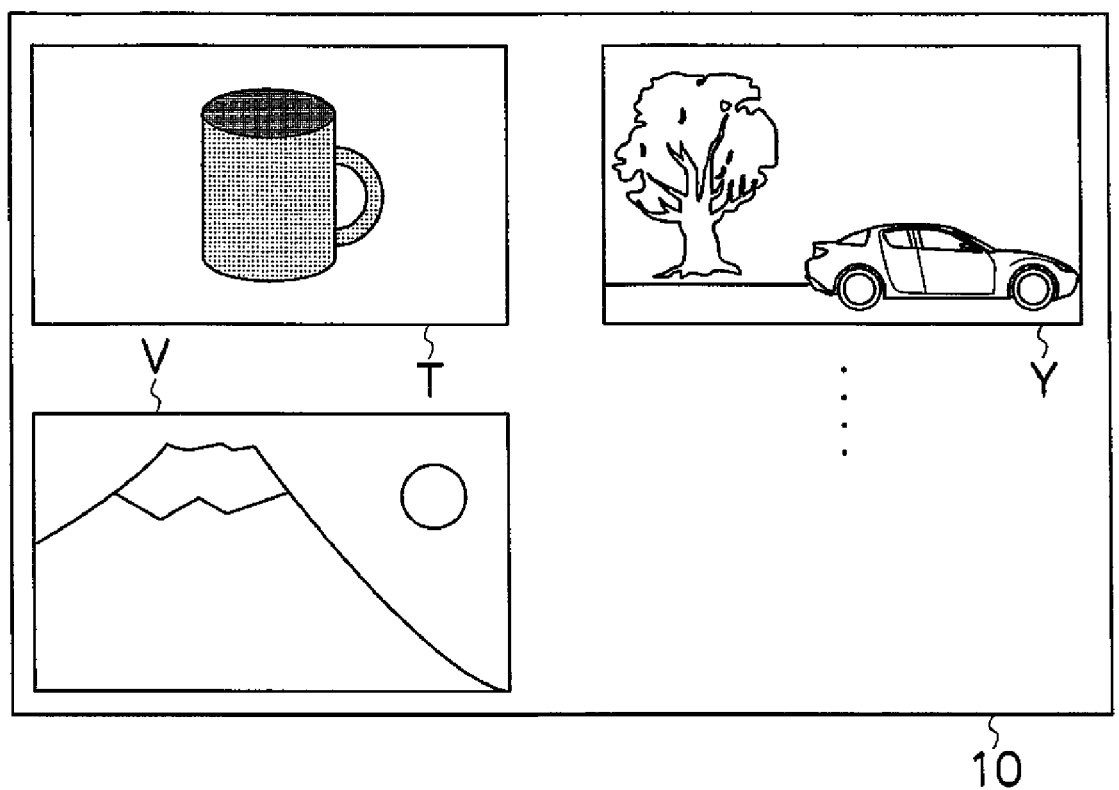
FIG. 12 is a diagram showing one example of thumbnails displayed by the listed picture display processing according to the fifth embodiment.

FIG. 12 shows one example of a list of a 3-dimensional thumbnail picture T, the normal thumbnail picture Y, a thumbnail picture V containing a distant subject and not subjected to the 3-dimensional CG processing that is displayed on the LCD 10 as a result of the execution of S94.

A sample thumbnail picture T has been subjected to the 3-dimensional CG processing so that the difference from the normal thumbnail Y or the thumbnail picture V of a picture containing a distant subject is clear at a glance.

Additionally, the 3-dimensional CG processing is performed only on the multi-view picture containing a subject at a short range at the shooting. Therefore, it is not necessary to perform the 3-dimensional CG processing uniformly on a picture containing a distant subject that is ineffective if the relevant processing is performed, improving the efficiency of processing.

Sixth Embodiment

Figure 13:
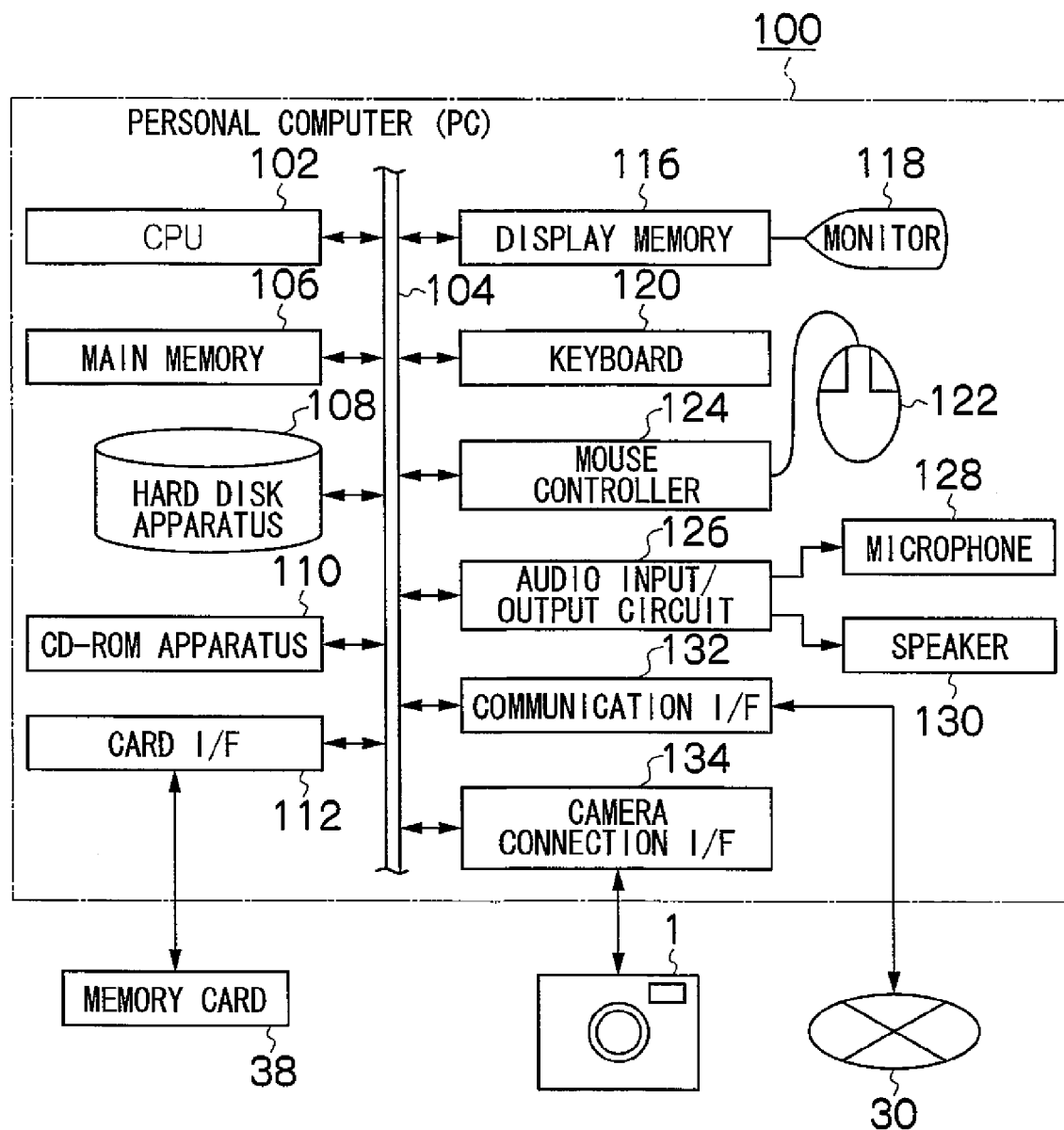
FIG. 13 is a block diagram of a PC.

FIG. 13 is a block diagram of PC 100. The PC 100 comprises: a central processing unit (CPU) 102 which mainly controls the operation of each component; a main memory 106 which stores a control program for the apparatus and is a working region at the program execution; a hard disk apparatus 108 which stores the operating system (OS) of the PC 100, various application software including a program for picture edit processing to edit a viewpoint picture to adapt to device drivers for peripheral devices connected to the PC 100, and pictures of a user; a CD-ROM apparatus 110; a display memory 116 which temporally stores display data; a monitor apparatus 118 such as a CRT monitor or an LCD monitor which displays a picture or characters using picture data or character data from the display memory 116; a keyboard 120; a mouse 122 as a position input apparatus; a mouse controller 124 which detects the state of the mouse 122 and outputs a signal such as of the position of a mouse pointer on the monitor apparatus 118 or the state of the mouse 122 to the CPU 102; a communication interface 132 connected to a network 30 such as the Internet, a card interface 112 including a card insertion opening which the memory card 38 is attached to and detached from; a bus 104 which connects the respective components; and a camera connection I/F 134 which connects to the camera 1 via a USB.

Application software for the picture edit processing stored in the hard disk apparatus 108 can be installed in the PC 100 by setting a CD-ROM which records the application software in the CD-ROM apparatus 110 of the PC 100.

The monitor apparatus 118 displays a picture similarly to the LCD 10.

The hard disk apparatus 108 stores a multi-view picture or a normal picture received from the pantoscopic camera 1 via the camera connection I/F 134, or a multi-view picture or a normal picture captured from the memory card 38 via a card I/F 112.

The CPU 102 performs the listed picture display processing according to the first to fifth embodiments discussed in the above on the multi-view picture and normal picture stored in the hard disk apparatus 108. The processing can be independently executed on each picture each time a picture is stored in the hard disk apparatus 108, or can be collectively performed on all pictures stored in the hard disk apparatus 108 in response to a direction through the keyboard 120 or the mouse 122.

That is, the listed picture display processing does not necessarily be performed by the camera 1, but other apparatuses can also realize the processing.

Seventh Embodiment

Figure 14:
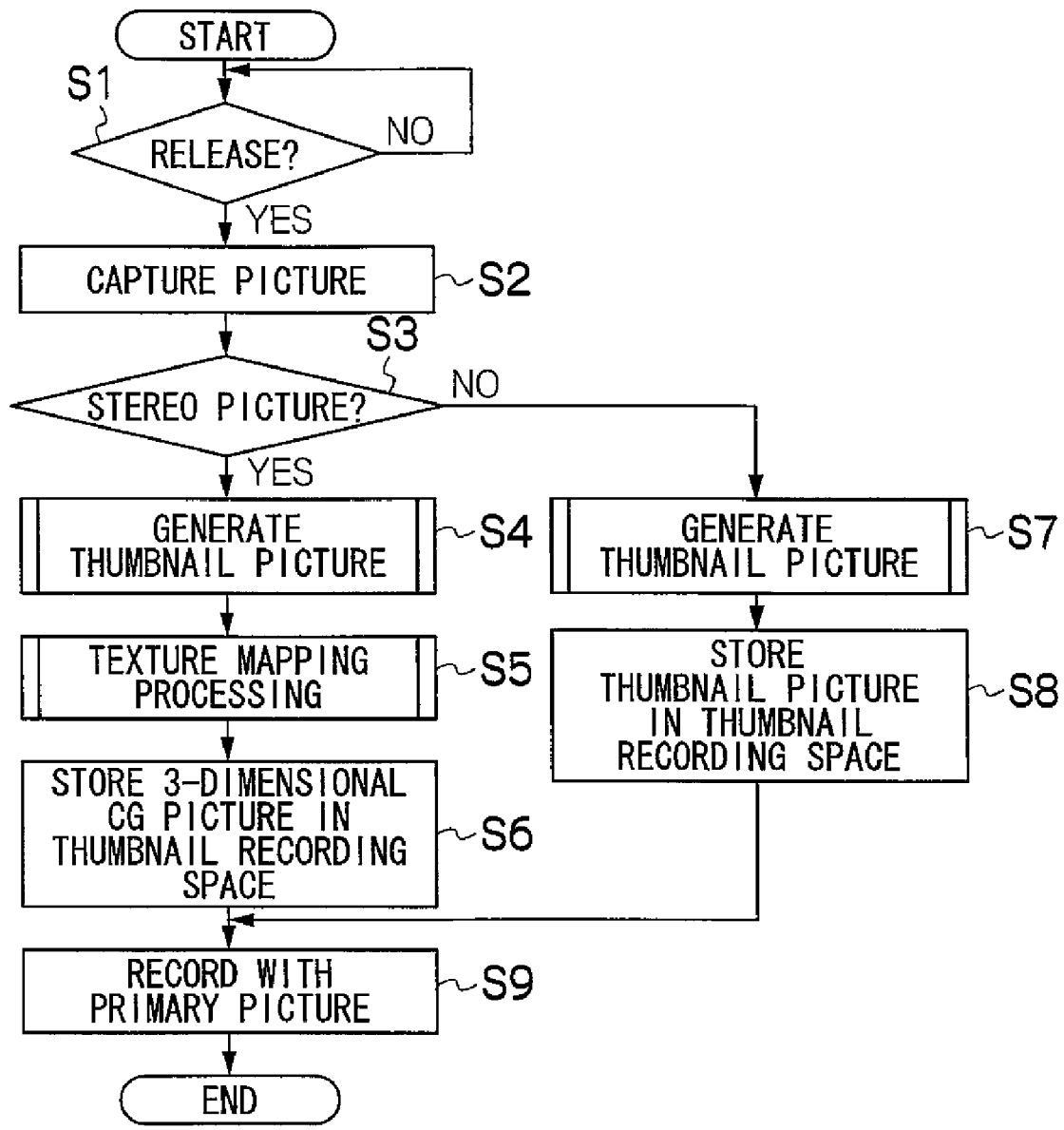
FIG. 14 is a flowchart of picture record processing according to a seventh embodiment.

The following will describe the flow of picture record processing executed by the camera 1 with reference to a flowchart in FIG. 14. A program to define the processing is stored in the EEPROM 146 and is executed by the main CPU 62. In response to a direction "display thumbnail-picture list" by the operation unit 70, the processing is performed collectively on all the multi-view pictures stored in the memory card 38.

At S1, it is judged whether or not the still picture release switch 5a is completely pressed. If the still picture release switch 5a is completely pressed, the flow proceeds to S2.

At S2, still picture data for recording is started to be captured. The captured picture data (a primary picture) is once stored in a primary picture buffer retained in the buffer memory 42.

At S3, the 2D/3D mode switch flag 168 is judged. If a 3D mode flag is set, the flow proceeds to S3. If a 2D mode flag is set, the flow proceeds to S7.

At S4, a thumbnail picture is created from the multi-view picture stored in the primary picture buffer. Specifically, the picture can be created by thinning out only a picture for a left eye, only a picture for a right eye, or the both, as in the paragraph 0040 in Japanese Patent Application Laid-Open No. 2004-120165.

At S5, a 3-dimensional thumbnail picture is created by performing the 3-dimensional CG processing on the created thumbnail picture. For example, as shown in FIG. 3, the texture mapping is performed to paste a corresponding region of the thumbnail picture th to the polygon PG of a 3-dimensional shaped model corresponding to a primary subject and other various objects (FIG. 3 shows a mug, but it can be a person, etc.) in the picture to gain the 3-dimensional CG thumbnail picture X. The specific approach is similar to Japanese Patent Application Laid-Open No. 2002-24850. Alternatively, a 3-dimensional CG thumbnail picture can be created by performing the 3-dimensional CG processing on the original multi-view picture and thinning out the picture. However, the method of creating a thumbnail first is better in a processing load.

Other 3D computer graphic approaches can also be applied to a thumbnail picture to create a 3-dimensional CG thumbnail picture.

At S6, the created 3-dimensional CG thumbnail picture is stored in a thumbnail buffer retained in a buffer memory 41.

At S7, a thumbnail picture is created from a normal single-viewpoint picture stored in the picture file. Specifically, it can be created by thinning out a single-view picture similarly to a normal thumbnail picture. Such a thumbnail is referred to as a normal thumbnail picture.

At S8, the created normal thumbnail picture is stored in the thumbnail buffer retained in the buffer memory 42.

At S9, a thumbnail picture stored in the thumbnail buffer of the buffer memory 42 and a primary picture stored in the primary picture buffer are associated with each other and recorded in the memory card 38. The association of the both pictures can be performed, for example, by storing the both in the identical Exif (Exchangeable image file format) file and recording them in the memory card 38.

The processing at S3 to S9 can be performed each time a new still picture for recording is obtained or after a certain number of still pictures are taken and accumulated. In other words, the association and recording of a primary picture and a minified picture is important, and the creation of a 3-dimensional CG thumbnail picture can be performed at any time.

FIG. 4 shows one example of a list of the 3-dimensional CG thumbnail picture X and the normal thumbnail picture Y captured from a picture file recorded in the memory card 38 by the processing and displayed on the LCD 10 and other display apparatuses. The 3-dimensional CG thumbnail picture X is created at the steps S4 to S6, subjected to the 3-dimensional CG graphic processing and given a stereoscopic effect so that the difference from the normal thumbnail Y created at the steps S7 to S8 is clear at a glance. Consequently, a viewer can readily recognize the picture X as a minified picture of a multi-view picture without using a special display apparatus to realize a graphical approach.

Eighth Embodiment

Figure 15:
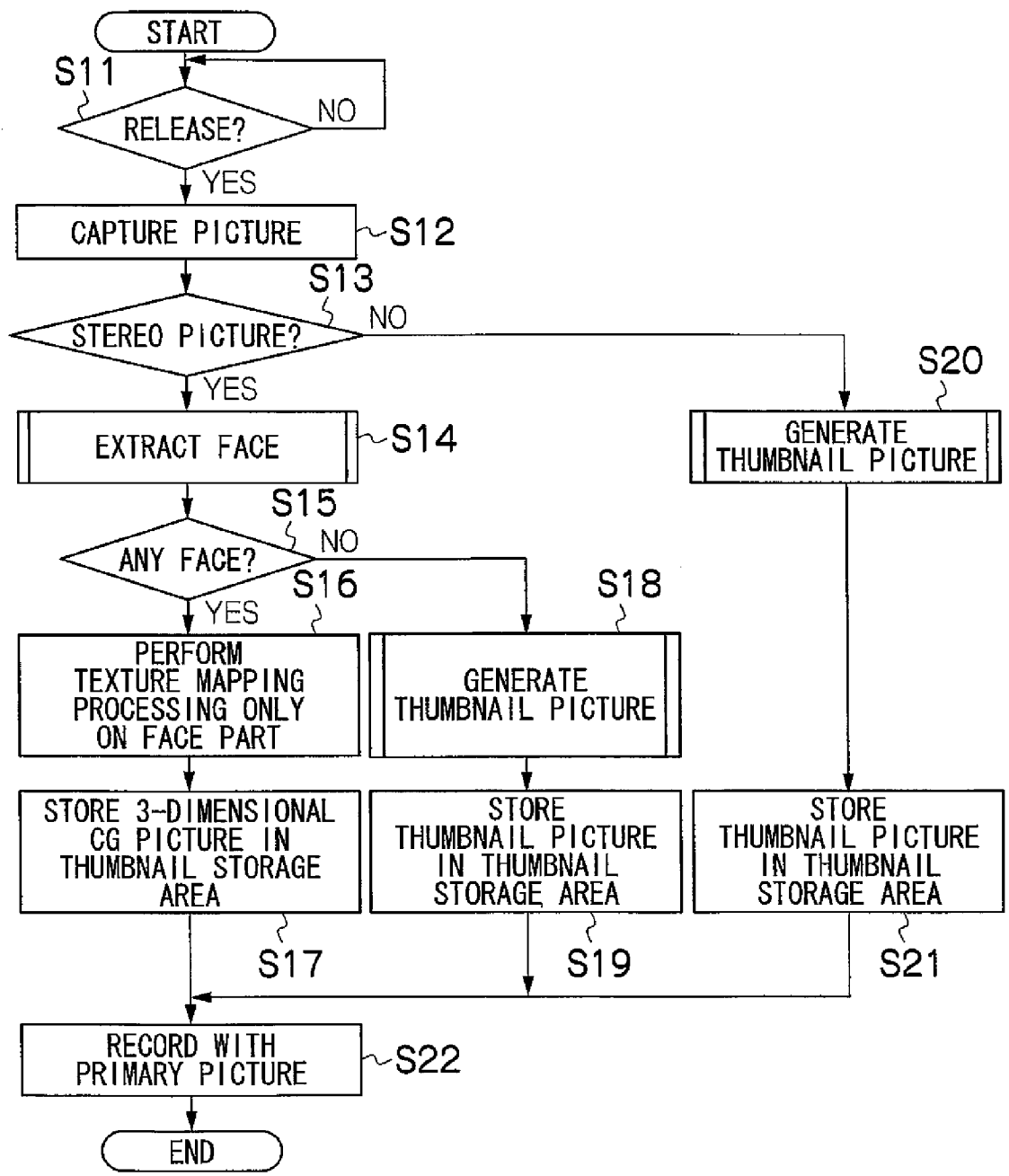
FIG. 15 is a flowchart of picture record processing according to an eighth embodiment.

FIG. 15 shows another example of the picture record processing. Herein, thumbnail pictures of multi-view pictures containing faces being shot are replaced to thumbnail pictures subjected to the 3-dimensional CG processing only on the face regions of the relevant multi-view pictures.

S11 to S13 are similar to S1 to S3.

At S14, the face detection unit 150 is instructed to extract a face from one or both of the multi-view pictures. In response to the instruction by the main CPU 62, the face detection unit 150 attempts to detect a face region from a picture for a left eye or a picture for a night eye stored in a picture file.

At S15, it is judged whether or not the face detection unit 150 can detect a face region. If a face region can be detected, the flow proceeds to S15; if it cannot be detected, the flow proceeds to S18.

At S16, a face region is extracted from a multi-view picture containing a face being shot, and the 3-dimensional CG processing is performed on the face region. This extracts a face region from the multi-view picture containing a face being shot and thins out the relevant multi-view picture at a predetermined thinning-out rate, for example. A region corresponding to the face region extracted from the original multi-view picture is set in the thinned out minified picture. If it is attempted to detect faces from the both viewpoint pictures, a face region is more preferably set in a viewpoint picture with higher detection accuracy. Then, texture mapping is performed to create a polygon specific to a face within the setting region and paste the thinned out face region to the relevant polygon, a thumbnail picture is gained that has been subjected to the 3-dimensional CG processing only on the face region. In this scheme, the 3-dimensional CG processing is performed after the creation of a thinned out picture.

Alternatively, texture mapping is performed to create a polygon specific to the person's face from the detected face itself and paste the face region to the relevant polygon, and a virtual CG picture is created that has been subjected to the 3-dimensional CG processing only on the face region of the multi-view picture. Then, the virtual CG picture is thinned out at a pre-determined thinning-out rate and a thumbnail picture is gained that has been subjected to the 3-dimensional CO processing only on the face region. The scheme creates a thinned out picture after the 3-dimensional CG processing.

The above texture mapping scheme needs to start from the polygon creation, hence the processing load is heavy to create an accurate polygon. A simple method of creating a polygon includes the following. First, configuration parts of a face are detected such as the contour of the face, eyes, a nose, a mouth from a detected face region, and polygon parting lines are decided depending on the positions of the detected configuration parts of a face. For example, the polygon parting lines are a line from the central part (glabella) between both eyes to the nose edge along the nasalis, a line circling both eyes, a line circling a mouth, and the contour of a face. By performing texture mapping-on the polygons, a simple 3-dimensional CO thumbnail picture is gained that includes rising mouth and nose parts and sunken surroundings of eyes.

At S17, the created 3-dimensional CG thumbnail picture is stored in the thumbnail buffer.

At S18, a thumbnail picture is created from the multi-view picture stored in the primary picture buffer. Specifically, the picture can be created by thinning out only a picture for a left eye, only a picture for a right eye, or the both, as in the paragraph 0040 in Japanese Patent Application Laid-Open No. 2004-120165.

S20 to S22 are similar to S7 to S9 in the above.

FIG. 6 shows one example of a list of a 3-dimensional thumbnail picture S corresponding to a multi-view picture containing a detected face, the normal thumbnail picture Y and the thumbnail picture Z corresponding to a multi-view picture not containing a detected face which are displayed on the LCD 10.

A sample thumbnail picture U is created at steps S4 to S6 and subjected to the 3-dimensional CG graphic processing only on the face region so that the difference from the normal thumbnail Y created at steps S20 to S21 or the minified picture Z of a simple viewpoint picture created at steps S15 to S19 is clear at a glance. Consequently, identification of a stereo picture containing a face subject is easy without using a special apparatus to realize a graphical approach. Additionally, the 3-dimensional CG graphic processing is performed on the face region using the original picture, hence the face outline in the original picture can be stereoscopically seen.

Ninth Embodiment

Figure 16:
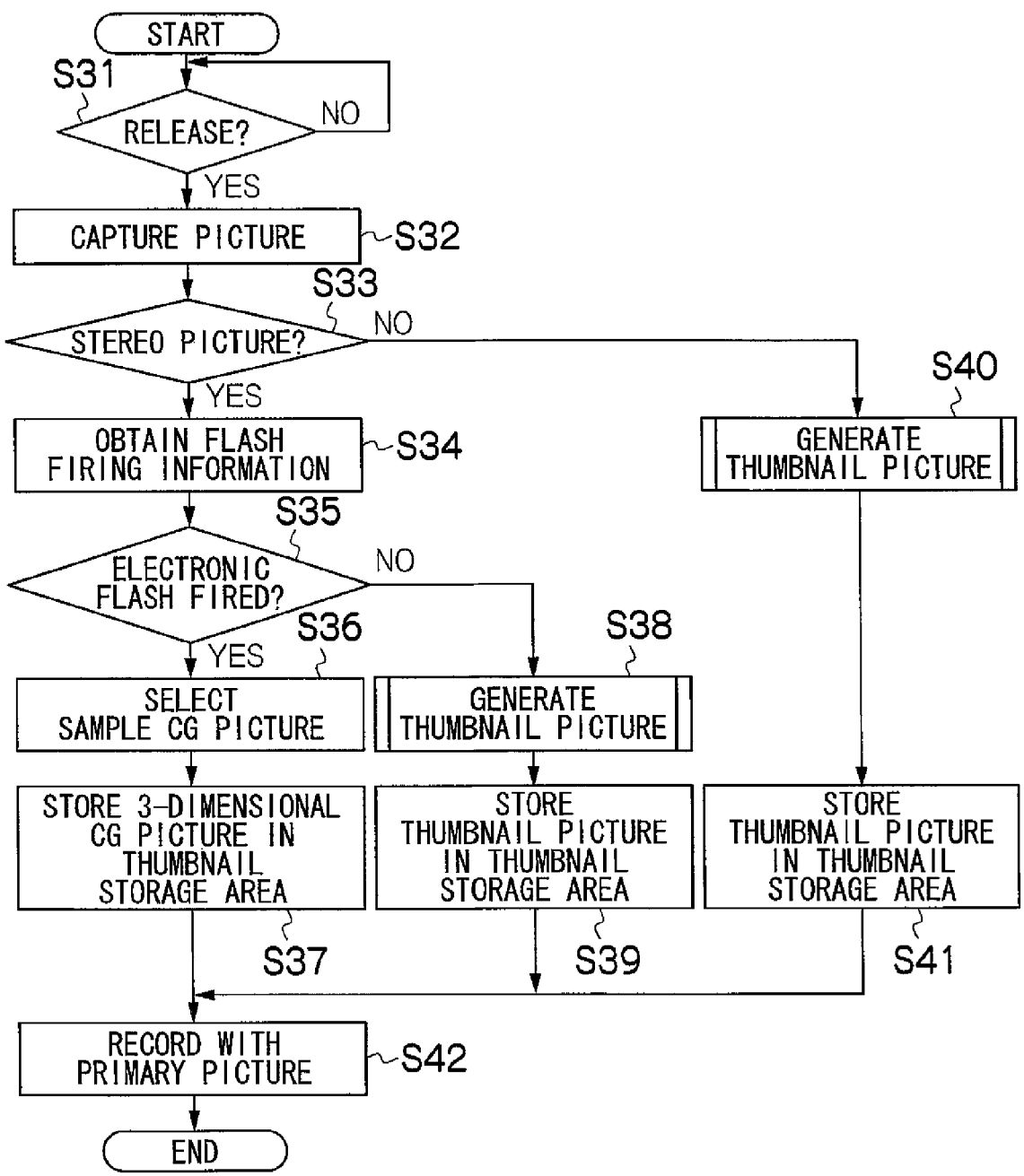
FIG. 16 is a flowchart of picture record processing according to a ninth embodiment.

FIG. 16 shows another example of the picture record processing executed by the main CPU 62. Herein, a thumbnail picture of a multi-view picture being taken using an electronic flash is replaced to a special sample.

S31 to S33 are similar to S1 to S3.

At S34, flash firing information is obtained from the photometric/telemetric CPUs 19a and 19b to identify the ON or OFF state of the electronic flashes 44a and 44b at the picture recording. The flash firing information is stored, for example, in a "Flash" tag of an Exif file.

At S35, the ON or OFF state of the electronic flashes 44a and 44b at the shooting is judged based on the flash firing information. If the electronic flashes 44a and 44b are at the ON state at the shooting, the flow proceeds to S36; if they are at the OFF state, the flow proceeds to S3.

At S36, a sample 3-dimensional thumbnail picture symbolizing to be a multi-view picture is retrieved from the EEPROM 146. The sample is given the stereo effect by the 3-dimensional CG processing and has been previously stored in the EEPROM 146, similarly to the second embodiment. The sample does not need to be an actual subject.

At S37, a 3-dimensional thumbnail picture of the retrieved sample is stored in the thumbnail buffer. A sample 3-dimensional thumbnail picture does not need to be identical to an actual subject, but is a thumbnail picture only to indicate to be a multi-view picture by a 3D graphic.

S38 to S42 are similar to S18 to S22 in the above.

FIG. 8 shows one example of a list of a sample 3-dimensional thumbnail picture W, the normal thumbnail picture Y and the minified picture Z of a stereo picture which are displayed on the LCD 10.

The sample thumbnail picture W retrieved from the EEPROM 146 at step S37 has been subjected to the 3-dimensional CG processing so that the difference from the normal thumbnail Y or the minified picture Z of a simple stereo picture is clear at a glance. Consequently, identification of a stereo picture containing a face subject is easy without using a special apparatus to realize a graphical approach.

Additionally, a dark multi-view picture under a no-flash firing condition which is difficult to be efficiently used as a multi-view picture does not need to be uniformly recorded with association to a sample, improving the efficiency of processing.

Tenth Embodiment

Figure 17:
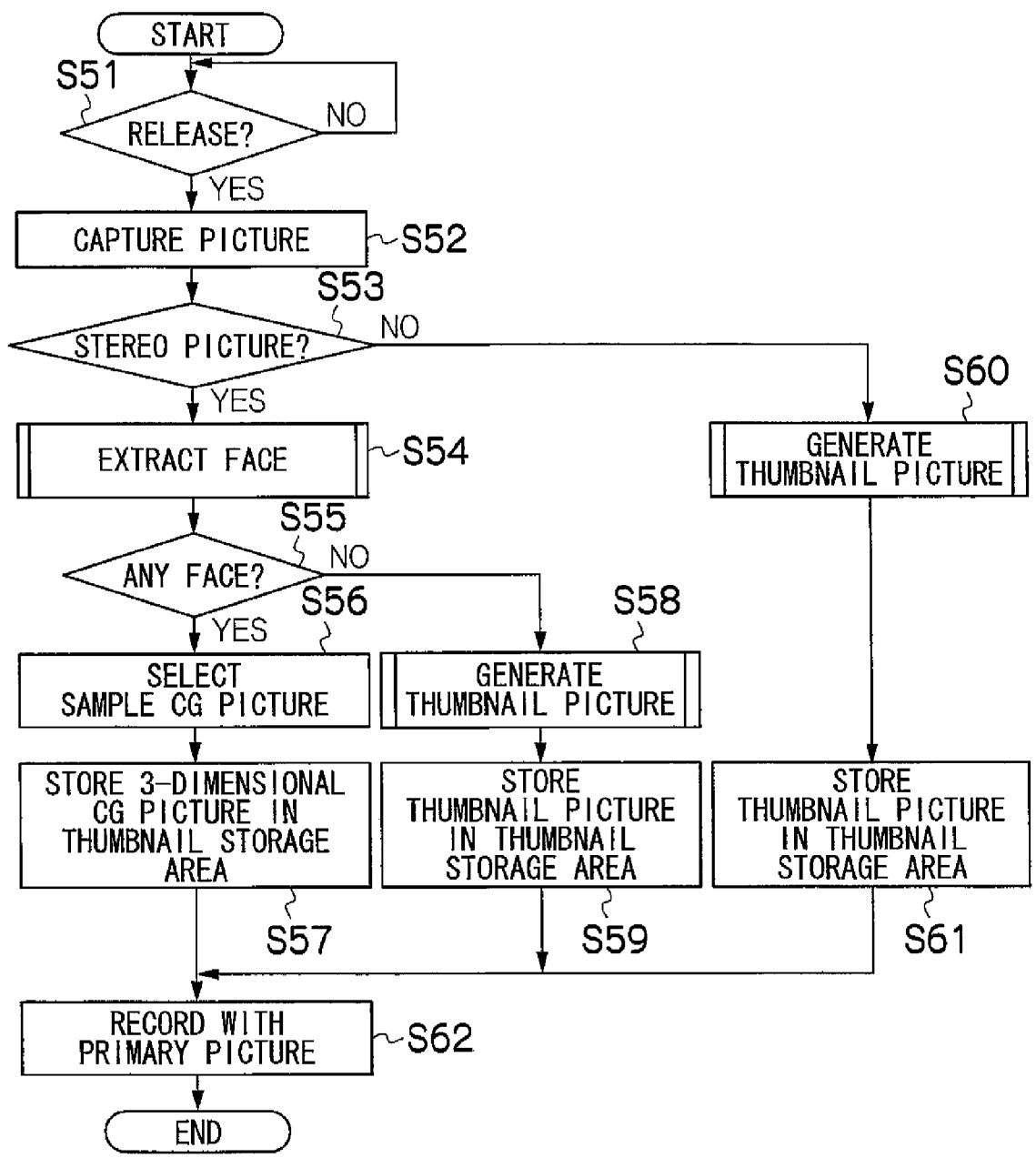
FIG. 17 is a flowchart of picture record processing according to a tenth-embodiment.

FIG. 17 shows another example of the picture record processing. Herein, a thumbnail picture of a multi-view picture containing a face being shot is replaced to a special sample.

S51 to S53 are similar to S1 to S3.

S54 to S55 are similar to S14 to S15. However, if it is judged at S55 that there is a face, the flow proceeds to S56; if it is judged that there is no face, the flow proceeds to S58.

At S56, a sample-3-dimensional-thumbnail picture symbolizing to be a multi-view picture containing a face being shot is retrieved from the EEPROM 146.

At S57, the retrieved sample is stored in the thumbnail buffer. A sample 3-dimensional thumbnail picture does not need to be identical to a face of an actual subject, but can be a face of a sample person, whose face or body is previously given a stereo effect in a 3D graphic.

S58 to S62 are similar to S18 to S22 in the above.

FIG. 10 shows one example of a list of the sample 3-dimensional thumbnail picture U, the normal thumbnail picture Y, and the minified picture Z of a stereo picture which are displayed on the LCD 10.

The sample thumbnail picture U has been subjected to the 3-dimensional CG graphic processing so that the difference from the normal thumbnail Y or a minified picture of the stereo picture Z is clear at a glance. Consequently, identification of a stereo picture containing a face subject is easy without using a special apparatus to realize a graphical approach.

Eleventh Embodiment

Figure 18:
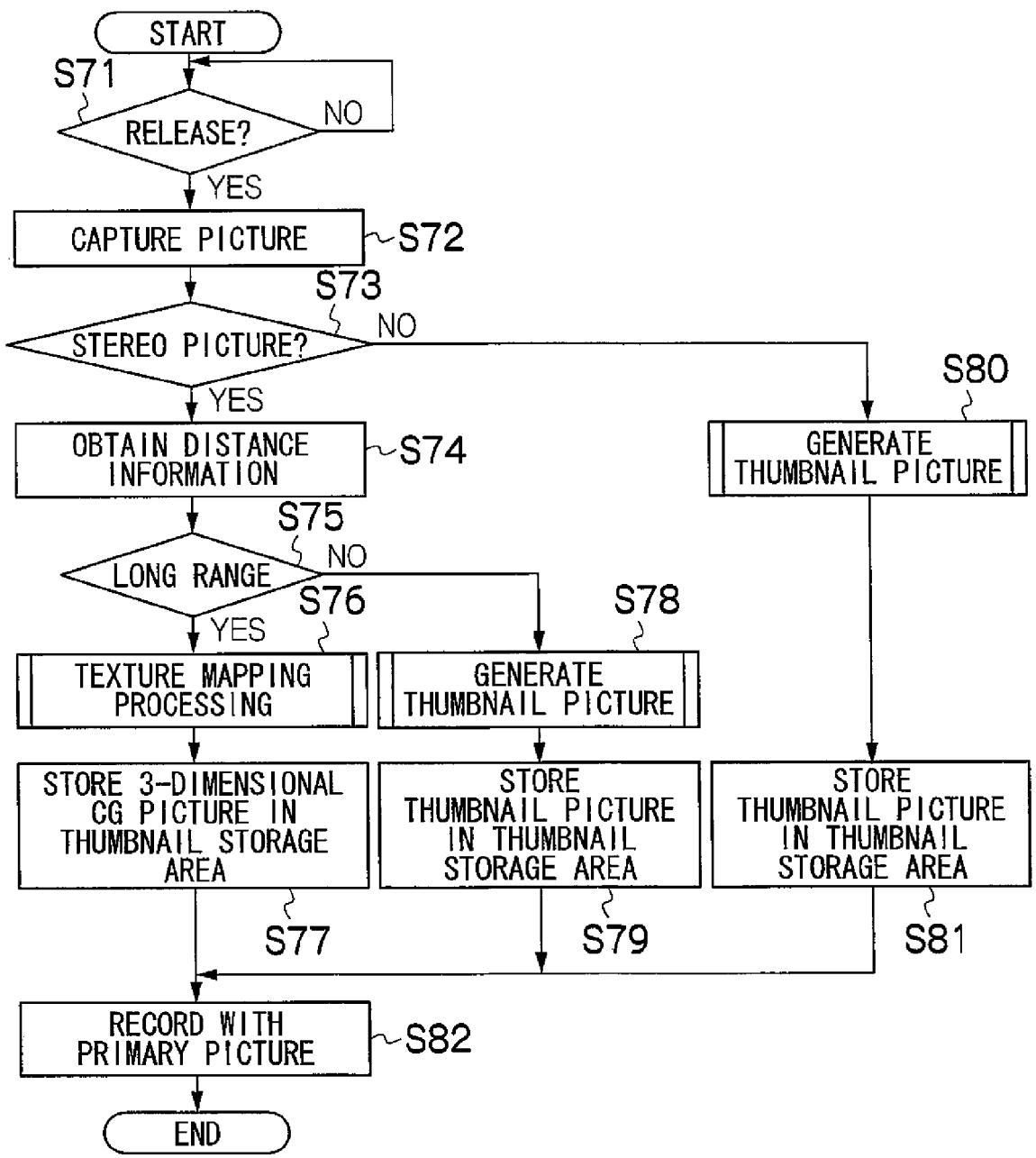
FIG. 18 is a flowchart of picture record processing according to a eleventh embodiment.

FIG. 18 shows another example of the picture record processing. Herein, only a thumbnail picture of a multi-view picture containing a shot subject at short range is subjected to the 3-dimensional CG processing.

S71 to S73 are similar to S1 to S3.

At S74, distance information is obtained from the distance information storage circuit 58 to identify the distance from the camera 1 to the subject at the shooting. The distance information is stored, for example, in a "SubjectDistance" tag of an Exif file. The distance information in the distance information storage circuit 58 can be gained from the distance imaging element 51a or gained from the distance imaging element 51b. Either information can be used, for example, distance information of a shorter distance is used.

At S75, it is judged whether or not a subject is at more distant position than a pre-determined distance (for example, D>10 m) based on distance information D. If the subject was not at longer range, i.e., it was at shorter range, the flow proceeds to S76; if the subject was at longer range, the flow proceeds to S78.

At S76, a 3-dimensional CG thumbnail picture is created similarly to S5.

At S77, the created 3-dimensional CG thumbnail-picture is stored in the thumbnail buffer retained in the buffer memory 42.

S78 to S82 are similar to S18 to S22 in the above.

FIG. 12 shows one example of a list of a 3-dimensional thumbnail picture T the normal thumbnail picture Y, and a thumbnail picture V containing a distant subject which has not been subjected to the 3-dimensional CG processing which are displayed on the LCD 10.

The sample thumbnail picture T containing a subject at short range has been subjected to the 3-dimensional CG processing so that the difference from the normal thumbnail Y or the thumbnail picture V of a picture containing a distant subject is clear at a glance without using a special apparatus to realize a graphical approach.

Additionally, the 3-dimensional CG processing is performed only on a multi-view picture containing a subject at short range at the shooting. As such, the 3-dimensional CG processing does not need to be performed uniformly on a picture containing a distant subject that is ineffective even if it is subjected to the relevant processing, improving the efficiency of processing.

Twelfth Embodiment

Figure 19:
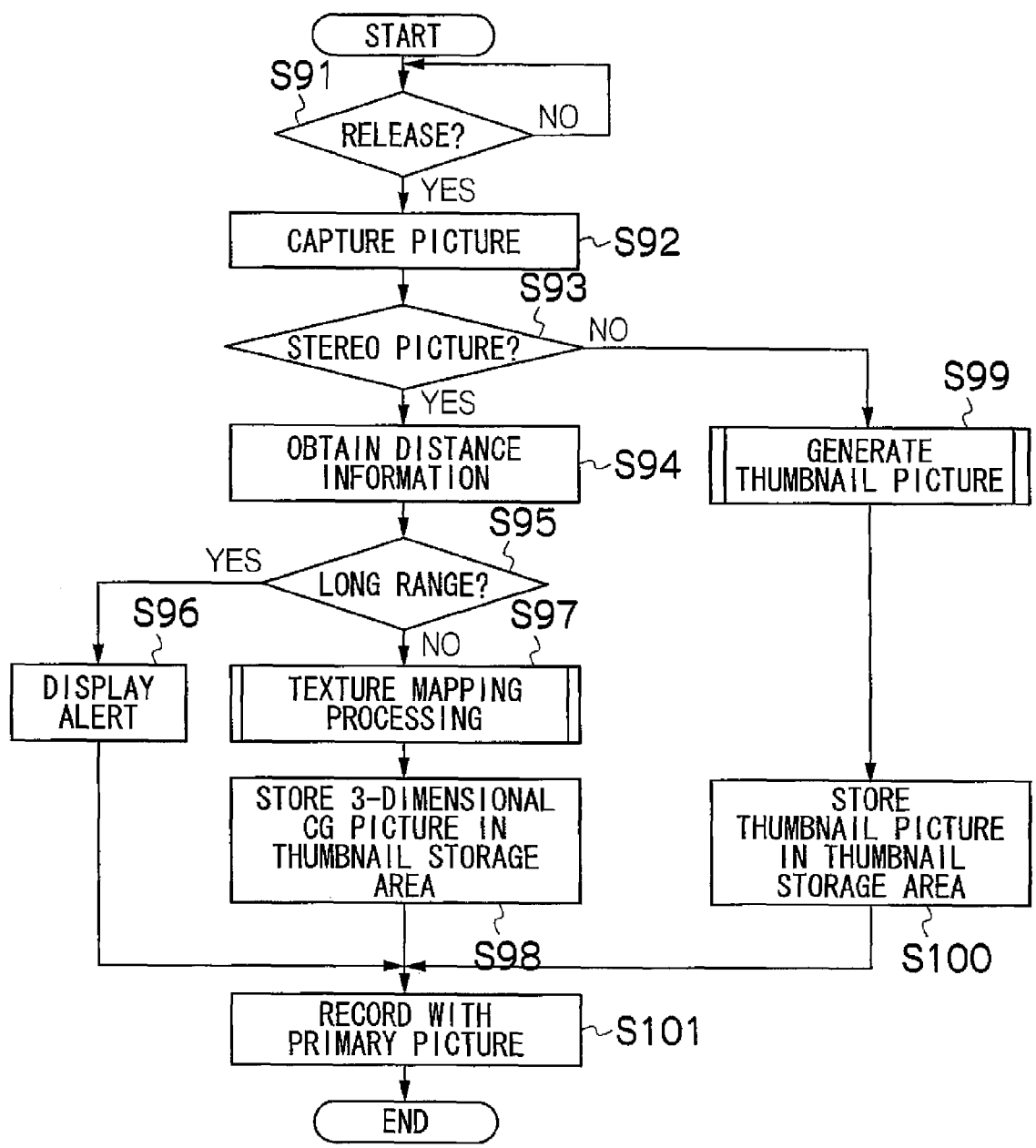
FIG. 19 is a flowchart of picture record processing according to a twelfth embodiment.

FIG. 19 shows another example of the picture record processing. Herein, if a subject at long range is shot as a multi-view picture, an alert is put out and the multi-view picture is not recorded. On the other hand, the 3-dimensional CG processing is performed only on a thumbnail picture of the multi-view picture being taken at short range and the thumbnail picture is recorded in association with a primary picture.

S91 to S95 are similar to S71 to S75. However, if it is judged at S96 that a subject is at long range, the flow proceeds to S96; if it is judged that the subject is at short range, the flow proceeds to S97.

At S96, an alert is displayed on the LCD 10 indicating that the subject is at long range and a multi-view picture is not recorded. Then, the flow does not proceed to picture recording at S101 but ends the processing.

S97 to S98 are similar to S76 to S77. And S99 to S101 are similar to S80 to S82.

In the processing, the 3-dimensional CG processing is performed only on a multi-view picture containing a subject at short range at the shooting, and the multi-view picture is recorded in association with a primary picture. As such, the 3-dimensional CG processing does not need to be performed uniformly on a picture containing a distant subject that is ineffective even if it is subjected to the relevant processing, improving the efficiency of processing.

Further in the processing, an alert is displayed for a multi-view picture containing a subject at long range at the shooting, and a primary picture of the multi-view picture is not recorded. That is, it is not necessary to record a multi-view picture which contains a distant subject and has no stereoscopic vision effect, improving the efficiency of processing.

Other Embodiments

Part or all of the seventh to twelfth embodiments can be combined. For example, only if a face is detected and an electronic flash is fired at the shooting, a minified picture subjected to the 3-dimensional CG processing can be recorded in association with a primary picture. Alternatively, only if a face is detected and an electronic flash is fired at the shooting, a sample minified picture subjected to the 3-dimensional CG processing can be recorded in association with a primary picture.

Alternatively, only if the subject distance is short and an electronic flash is fired at the shooting, a minified picture subjected to the 3-dimensional CG processing can be recorded in association with a primary picture. Alternatively, only if the subject distance is short and an electronic flash is fired at the shooting, a sample minified picture subjected to the 3-dimensional CG processing can be recorded in association with a primary picture.

It is assumed that the subject distance to be short if a face is detected. Therefore, if a face is detected, the determination can be omitted whether the subject distance is short or long.

What is claimed is:

1. A picture processing apparatus comprising:
   a picture input unit which inputs pictures including a multi-view picture taken from two or more viewpoints and a single-view picture taken from a single viewpoint;
   a storage unit which stores a picture inputted to the picture input unit in a picture file;
   a minified picture creation unit which creates a first minified picture produced by minifying a picture stored in the storage unit;
   a picture identification unit which identifies whether a picture stored in the storage unit is a multi-view picture or a single-view picture;
   a distance identification unit which identifies whether a subject in a picture identified by the picture identification unit to be a multi-view picture is at long range or short range based on distance information in the picture file in which the multi-view picture is stored;
   a picture processing unit which creates a second minified picture by performing virtual 3-dimensional computer graphic processing on the first minified picture created from a picture which is identified by the picture identification unit to be a multi-view picture and for which the distance identification unit identifies that the subject is at short range; and
   a display unit which, in response to a direction to display a list of pictures stored in the storage unit, displays the first minified picture created by the minified picture creation unit in the list as a representative picture of pictures identified by the picture identification unit to be single-view pictures, displays the first minified picture created by the minified picture creation unit in the list as a representative picture of pictures which are identified by the picture identification unit to be multi-view pictures and for which the distance identification unit identifies that the subject is at long range, and displays the second minified picture created by the picture processing unit in the list as a representative picture of pictures which are identified by the picture identification unit to be multi-view pictures and for which the distance identification unit identifies that the subject is at short range.

2. The picture processing apparatus according to claim 1, comprising:
   a distance information processing circuit which calculates distance information to the subject; and
   a distance information storage circuit which stores the distance information calculated by the distance information processing circuit in the picture file.

3. The picture processing apparatus according to claim 1, wherein:
   the minified picture creation unit creates a first minified picture produced by minifying a picture stored in the storage unit each time the storage unit stores a new picture; and
   the picture processing unit creates a second minified picture by performing virtual 3-dimensional computer graphic processing on the first minified picture created from a picture which is identified by the picture identification unit to be a multi-view picture and for which the distance identification unit identifies that the subject is at short range each time the storage unit stores a new picture.

4. The picture processing apparatus according to claim 1, wherein the display unit displays the first minified picture and the second minified picture in the list in the order of storage dates and times of the pictures from which the first minified picture and the second minified picture were created.

5. The picture processing apparatus according to claim 1, wherein the picture processing unit creates the second minified picture by performing transformation from object coordinates to visual-field coordinates by pasting a corresponding region in the first minified picture to 3-dimensional model data corresponding to the subject in the first minified picture created from a picture which is identified by the picture identification unit to be the multi-view picture and for which the distance identification unit identifies that the subject is at short range, and performing virtual 3-dimensional computer graphic processing for perspective projection of the model data transformed to the visual-field coordinates on a 2-dimensional plane.

6. The picture processing apparatus according to claim 1, wherein the display unit is a monitor which does not employ a graphical approach.

7. A picture processing method including the steps of:
   inputting pictures including a multi-view picture taken from two or more viewpoints and a single-view picture taken from a single viewpoint;
   storing the inputted picture in a picture file;
   creating a first minified picture produced by minifying the stored picture;
   identifying whether the stored picture is a multi-view picture or a single-view picture;
   identifying whether a subject in a picture identified to be the multi-view picture is at long range or short range based on distance information in the picture file in which the multi-view picture is stored;
   creating a second minified picture by performing virtual 3-dimensional computer graphic processing on the first minified picture created from a picture which is identified to be the multi-view picture and for which it is identified that the subject is at short range; and
   in response to a direction to display a list of the stored pictures, displaying the first minified picture in the list as a representative picture of pictures identified to be the single-view pictures, displaying the first minified picture in the list as a representative picture of pictures which are identified to be the multi-view pictures and for which it is identified that the subjects are at long range, and displaying the second minified picture in the list as a representative picture of pictures which are identified to be the multi-view pictures and for which it is identified that the subjects are at short range.

8. The picture processing method according to claim 7, including the steps of:
   calculating distance information to the subject; and
   storing the calculated distance information in the picture file.

9. The picture processing method according to claim 7, including the steps of:
   creating a first minified picture produced by minifying the stored picture at each time of storing a new picture; and
   creating a second minified picture by performing virtual 3-dimensional computer graphic processing on the first minified picture created from a picture which is identified to be the multi-view picture and for which it is identified that the subject is at short range at each time of storing a new picture.

10. The picture processing method according to claim 7, including the step of displaying the first minified picture and the second minified picture in the list in the order of storage dates and times of the pictures from which the first minified picture and the second minified picture were created.

11. The picture processing method according to claim 7, including the step of creating the second minified picture by performing transformation from object coordinates to visual-field coordinates by pasting a corresponding region in the first minified picture to 3-dimensional model data corresponding to the subject in the first minified picture created from a picture which is identified to be the multi-view picture and for which it is identified that the subject is at short range, and performing virtual 3-dimensional computer graphic processing for perspective projection of the model data transformed to the visual-field coordinates on a 2-dimensional plane.

12. The picture processing method according to claim 7, wherein the first minified picture and the second minified picture are displayed on a monitor which does not employ a graphical approach.

13. A picture processing program embodied on the memory of a computer, wherein the computer executes the steps of: inputting pictures including a multi-view picture taken from two or more viewpoints and a single-view picture taken from a single viewpoint; storing the inputted picture in a picture file; creating a first minified picture produced by minifying the stored picture; identifying whether the stored picture is a multi-view picture or a single-view picture based on distance information in the picture file in which the multi-view picture is stored; identifying whether a subject in a picture identified to be the multi-view picture is at long range or short range; creating a second minified picture by performing virtual 3-dimensional computer graphic processing on the first minified picture created from a picture which is identified to be the multi-view picture and for which it is identified that the subject is at short range; and in response to a direction to display a list of the stored pictures, displaying the first minified picture in the list as a representative picture of pictures identified to be the single-view pictures, displaying the first minified picture in the list as a representative picture of pictures which are identified to be the multi-view pictures and for which it is identified that the subjects are at long range, and displaying the second minified picture in the list as a representative picture of pictures which are identified to be the multi-view pictures and for which it is identified that the subjects are at short range.

14. The picture processing program according to claim 13, including the steps of:
calculating distance information to the subject; and
storing the calculated distance information in the picture file.

15. The picture processing program according to claim 13, including the steps of:
creating a first minified picture produced by minifying the stored picture at each time of storing a new picture; and
creating a second minified picture by performing virtual 3-dimensional computer graphic processing on the first minified picture created from a picture which is identified to be the multi-view picture and for which it is identified that the subject is at short range at each time of storing a new picture.

16. The picture processing program according to claim 13, including the step of displaying the first minified picture and the second minified picture in the list in the order of storage dates and times of the pictures from which the first minified picture and the second minified picture were created.

17. The picture processing program according to claim 13, including the step of creating the second minified picture by performing transformation from object coordinates to visual-field coordinates by pasting a corresponding region in the first minified picture to 3-dimensional model data corresponding to the subject in the first minified picture created from a picture which is identified to be the multi-view picture and for which it is identified that the subject is at short range, and performing virtual 3-dimensional computer graphic processing for perspective projection of the model data transformed to the visual-field coordinates on a 2-dimensional plane.

18. The picture processing program according to claim 13, wherein the first minified picture and the second minified picture are displayed on a monitor which does not employ a graphical approach.

19. A picture recording apparatus comprising:
a photographing unit which can take pictures including a multi-view picture taken from two or more viewpoints and a single-view picture taken from a single viewpoint;
a primary picture storage unit which stores a primary picture being a multi-view picture or a single-view picture taken by the photographing unit;
a picture identification unit which identifies whether a primary picture stored in the primary picture storage unit is a multi-view picture or a single-view picture;
a distance identification unit which identifies whether a subject in a picture identified by the picture identification unit to be a multi-view picture is at long range or short range;
a picture processing unit which creates a first minified picture by minifying the primary picture and creates a second minified picture by performing 3-dimensional computer graphic processing on the first minified picture created from the primary picture which the picture identification unit identifies to be a multi-view picture and for which the distance identification unit identifies that a subject is at short range;
a minified picture storage unit which stores the first minified picture or the second minified picture created by the picture processing unit in response to the identification whether to be the multi-view picture or the single-view picture by the picture identification unit and the identification of the distance of the subject by the distance identification unit; and
a recording unit which records the first minified picture or the second minified picture stored in the minified picture storage unit and the primary picture stored in the primary picture storage unit in association with each other.

20. The picture recording apparatus according to claim 19, wherein the recording unit records only a primary picture for which the distance identification unit identifies that a subject is at short range among primary pictures identified by the picture identification unit to be multi-view pictures.

21. The picture recording apparatus according to claim 20, further comprising a notification unit which notifies of an alert that a primary picture is not recorded which the picture identification unit identifies to be a multi-view picture and for which the distance identification unit identifies that a subject is at long range.

22. A picture recording method including the steps of:
taking pictures including a multi-view picture taken from two or more viewpoints and a single-view picture taken from a single viewpoint;
storing a taken primary picture being a multi-view picture or a single-view picture;
identifying whether the stored primary picture is a multi-view picture or a single-view picture;
identifying whether a subject in a picture identified to be the multi-view picture is at long range or short range;
creating a first minified picture by minifying the primary picture and creating a second minified picture by performing 3-dimensional computer graphic processing on the first minified picture created from the primary picture which is identified to be the multi-view picture and for which it is identified that the subject is at short range;

storing the first minified picture or second minified picture in response to the identification whether to be the multi-view picture or the single-view picture and the identification of the distance of the subject; and recording the first minified picture or second minified picture being stored and the stored primary picture in association with each other.

23. The picture recording method according to claim 22, recording only a primary picture for which it is identified that the subject is at short range among a plurality of the primary pictures identified to be the multi-view pictures.

24. The picture recording method according to claim 23, further including a step of notifying an alert that the primary picture is not recorded which is identified to be the multi-view picture and for which it is identified that the subject is at long range.

25. A picture recording program embodied on the memory of a computer, wherein the computer executes the steps of: taking pictures including a multi-view picture taken from two or more viewpoints and a single-view picture taken from a single viewpoint; storing a primary picture which is a multi-view picture or a single-view picture being taken; identifying whether the stored primary picture is a multi-view picture or a single-view picture; identifying whether a subject in a picture identified to be the multi-view picture is at long range or short range; creating a first minified picture produced by minifying the primary picture, and creating a second minified picture by performing 3-dimensional computer graphic processing on the first minified picture created from the primary picture which is identified to be the multi-view picture and for which it is identified that the subject is at short range; in response to the identification of the multi-view picture or the single-view picture and the identification of a distance of the subject, storing the first minified picture or second minified picture; and recording the stored first minified picture or second minified picture in association with the stored primary picture.

26. The picture recording program according to claim 25, for the primary picture identified to be the multi-view picture, recording only the primary picture for which it is identified that the subject is at short range.

27. The picture recording program according to claim 26, further including the step of notifying of an alert that a primary picture is not recorded which is identified to be the multi-view picture and for which it is identified that the subject is at long range.

* * * * *